US010241563B2

(12) United States Patent
Ware

(10) Patent No.: US 10,241,563 B2
(45) Date of Patent: Mar. 26, 2019

(54) DYNAMICALLY CHANGING DATA ACCESS BANDWIDTH BY SELECTIVELY ENABLING AND DISABLING DATA LINKS

(71) Applicant: Rambus Inc., Sunnyvale, CA (US)

(72) Inventor: Frederick A. Ware, Los Altos Hills, CA (US)

(73) Assignee: Rambus Inc., Sunnyvale, CA (US)

( * ) Notice: Subject to any disclaimer, the term of this patent is extended or adjusted under 35 U.S.C. 154(b) by 223 days.

(21) Appl. No.: 15/214,266

(22) Filed: Jul. 19, 2016

(65) Prior Publication Data
US 2016/0328008 A1 Nov. 10, 2016

Related U.S. Application Data

(63) Continuation of application No. 14/232,187, filed as application No. PCT/US2012/043258 on Jun. 20, 2012, now Pat. No. 9,417,687.
(Continued)

(51) Int. Cl.
G06F 1/32 (2006.01)
G06F 13/16 (2006.01)
(Continued)

(52) U.S. Cl.
CPC .......... *G06F 1/3287* (2013.01); *G06F 1/3253* (2013.01); *G06F 1/3278* (2013.01);
(Continued)

(58) Field of Classification Search
None
See application file for complete search history.

(56) References Cited

U.S. PATENT DOCUMENTS 7,370,132 B1 * 5/2008 Huang ................ G06F 13/4018
710/305
7,434,121 B2 10/2008 Astor
(Continued)

OTHER PUBLICATIONS

International Preliminary Report on Patentability, dated Jan. 14, 2014 in International Application No. PCT/US2012/043258. 7 pages.
(Continued)

*Primary Examiner* — Jaweed A Abbaszadeh
*Assistant Examiner* — Cheri L Harrington
(74) *Attorney, Agent, or Firm* — The Neudeck Law Firm, LLC

(57) ABSTRACT

Bandwidth for information transfers between devices is dynamically changed to accommodate transitions between power modes employed in a system. The bandwidth is changed by selectively enabling and disabling individual control links and data links that carry the information. During a highest bandwidth mode for the system, all of the data and control links are enabled to provide maximum information throughout. During one or more lower bandwidth modes for the system, at least one data link and/or at least one control link is disabled to reduce the power consumption of the devices. At least one data link and at least one control link remain enabled during each low bandwidth mode. For these links, the same signaling rate is used for both bandwidth modes to reduce latency that would otherwise be caused by changing signaling rates. Also, calibration information is generated for disabled links so that these links may be quickly brought back into service.

20 Claims, 20 Drawing Sheets

Related U.S. Application Data

(60) Provisional application No. 61/506,962, filed on Jul. 12, 2011.

(51) Int. Cl.
  *G06F 1/3287* (2019.01)
  *G06F 1/3293* (2019.01)
  *G06F 1/3234* (2019.01)

(52) U.S. Cl.
  CPC ........ *G06F 1/3293* (2013.01); *G06F 13/1694* (2013.01); *Y02D 10/151* (2018.01); *Y02D 10/157* (2018.01)

(56) References Cited

U.S. PATENT DOCUMENTS

| | | | | |
|---|---|---|---|---|
| 7,469,311 | B1* | 12/2008 | Tsu | G06F 13/4018 710/307 |
| 7,475,173 | B2 | 1/2009 | Nemazie et al. | |
| 7,480,808 | B2* | 1/2009 | Caruk | G06F 1/3203 713/300 |
| 7,793,030 | B2* | 9/2010 | Jenkins | G06F 13/4221 710/307 |
| 7,843,846 | B1 | 11/2010 | Dropps et al. | |
| 7,949,817 | B1* | 5/2011 | Sakarda | G06F 1/3203 710/307 |
| 8,762,760 | B2* | 6/2014 | Shafai | H04W 52/0206 713/324 |
| 2003/0074515 | A1 | 4/2003 | Resnick | |
| 2004/0087324 | A1* | 5/2004 | Ketchum | H04B 7/0413 455/513 |
| 2005/0140546 | A1* | 6/2005 | Park | G01S 7/4008 342/368 |
| 2005/0144488 | A1* | 6/2005 | Lee | G06F 1/3209 713/300 |
| 2005/0262284 | A1* | 11/2005 | Cherukuri | G06F 13/4265 710/307 |
| 2006/0034295 | A1* | 2/2006 | Cherukuri | G06F 13/4265 370/395.52 |
| 2006/0285847 | A1* | 12/2006 | McCall | G06F 13/4068 398/73 |
| 2007/0067548 | A1* | 3/2007 | Juenger | G06F 13/40 710/315 |
| 2007/0239922 | A1* | 10/2007 | Horigan | G06F 13/4286 710/307 |
| 2007/0283337 | A1 | 12/2007 | Kasahara et al. | |
| 2007/0283358 | A1 | 12/2007 | Kasahara et al. | |
| 2008/0005455 | A1 | 1/2008 | Macri et al. | |
| 2009/0144484 | A1 | 6/2009 | Sukegawa | |
| 2010/0087227 | A1* | 4/2010 | Francos | H03F 1/3247 455/562.1 |
| 2010/0316065 | A1* | 12/2010 | Kapil | G06F 13/385 370/465 |
| 2011/0202781 | A1* | 8/2011 | Wang | G06F 1/3203 713/323 |
| 2012/0106687 | A1* | 5/2012 | Bulzacchelli | H04L 25/14 375/354 |
| 2013/0003559 | A1 | 1/2013 | Matthews | |
| 2013/0007491 | A1* | 1/2013 | Iyer | G06F 1/3206 713/321 |
| 2014/0006831 | A1 | 1/2014 | Keish et al. | |

OTHER PUBLICATIONS

Written Opinion of the International Searching Authority, dated Dec. 27, 2012 in International Application No. PCT/US2012/043258. 6 pages.

International Search Report, dated Dec. 27, 2012 in International Application No. PCT/US2012/043258. 3 pages.

* cited by examiner

DYNAMICALLY CHANGING DATA ACCESS BANDWIDTH BY SELECTIVELY ENABLING AND DISABLING DATA LINKS

CLAIM OF PRIORITY

This application claims the benefit of and priority to commonly owned U.S. Provisional Patent Application No. 61/506,962, filed Jul. 12, 2011, the disclosure of which is hereby incorporated by reference herein.

TECHNICAL FIELD

This application relates generally to data access technology and more specifically, but not exclusively, to dynamically switching bandwidth for memory accesses.

BACKGROUND

Some computing platforms that have high performance requirements also have significant power constraints. For example, portable computing devices such as cell phones, tablets, and laptops occasionally run processing intensive applications such as video applications, gaming applications, and so on. However, it is imperative that such devices consume as little power as possible to provide a long battery life between charges.

To address this issue, conventional portable devices employ different power modes whereby a device switches between a high power mode and a low power mode depending on whether significant processing resources are currently required. To facilitate these different power modes, a device may restrict the use of high speed data transfers to the high power mode, and use lower data transfer speeds during the low power mode since lower data transfer speeds generally result in lower power consumption. Since mobile devices conventionally use uncalibrated and unterminated signaling, the switching between different data transfer rates is done relatively quickly and, as a result, does not generally result in a latency penalty.

As the performance capabilities of mobile devices increase, there is a corresponding need to support higher speed data transfers. Higher data transfer speeds are achieved through the use of wider data busses and/or faster signaling rates. In certain platforms, the use of faster signaling rates is preferred due to disadvantages that are associated with the use of wider data busses. For example, a portable device may employ a system-on-a-chip (SoC) that maintains data in a separate integrated circuit. In such a case, it is desirable to have a low pin count and hence, narrower data busses, so that the sizes of the integrated circuits are kept as small as possible. Moreover, the use of a larger number of off-chip links (e.g., signal paths) generally results in higher power consumption.

To meet the stricter timing requirements associated with the use of higher signaling rates, calibrated and terminated signaling may be employed. However, the use of calibrated and terminated signaling may cause latency issues in implementations that switch between different signaling rates to accommodate different power modes. For example, it may take 300 nanoseconds or longer to recalibrate a link. As a result, the latency associated with calibrating a link for a new signaling rate may exceed the maximum latency period of applications that have high quality of service (QoS) requirements. Consequently, there is a need for improved data transfer techniques that are able to support high performance data transfers while also facilitating low power consumption.

BRIEF DESCRIPTION OF THE DRAWINGS

Sample features, aspects and advantages of the disclosure will be described in the detailed description and appended claims that follow and the accompanying drawings, wherein:

Figure 1A:
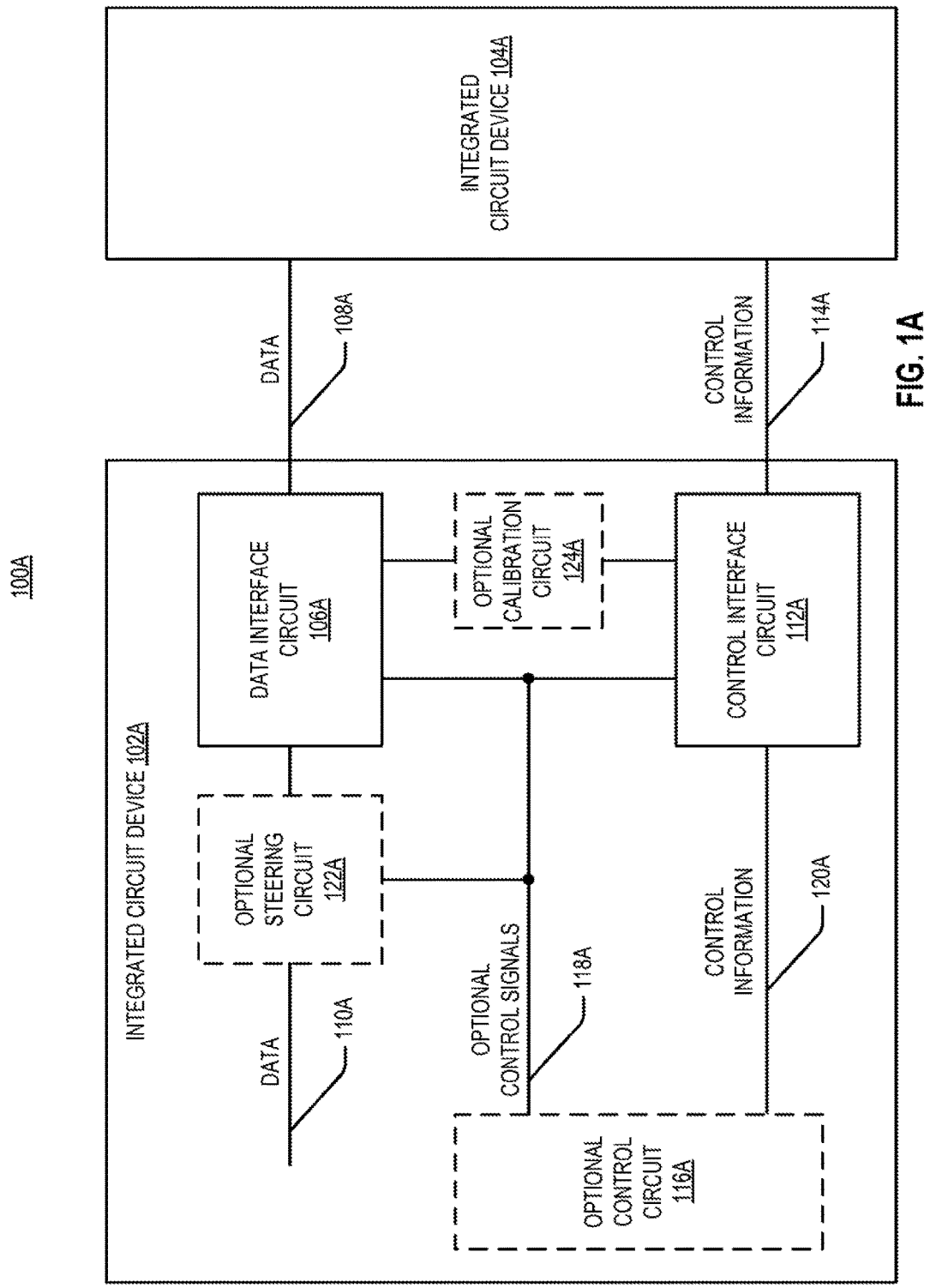
FIGS. 1A-1D are simplified block diagrams of different embodiments of a memory system operable to dynamically change memory access bandwidth by disabling and enabling control links and/or data links.

In accordance with common practice the various features illustrated in the drawings may not be drawn to scale.

DETAILED DESCRIPTION

The disclosure relates in some aspects to dynamically changing the bandwidth used for information transfers between devices in a system to accommodate transitions between lower and higher power modes employed in the system. The devices change the bandwidth by selectively enabling and disabling individual control links and/or data links that carry the information. During a high power mode for the system, all of the data and control links are enabled to provide a maximum rate of information transfer between devices. Hence, the devices are said to operate in a high bandwidth mode in this case since the information transfers (e.g., for data bits and/or control bits) between devices occur at a higher bandwidth as compared to lower bandwidth modes. During one or more lower power modes for the system, at least one data link and/or at least one control link is operated in a manner to reduce the power consumption of the devices. In some embodiments, a link is disabled to reduce power consumption. In other embodiments, a link is operated at a lower signaling rate to reduce power consumption. Hence, the devices are said to operate in a lower bandwidth mode in each of these cases since information is transferred between the devices at a lower rate (i.e., at a lower bandwidth) as compared to a higher bandwidth mode.

At least one data link and at least one control link remain enabled during each lower bandwidth mode. Advantageously, for each link that remains enabled during the lower and higher bandwidth modes, the same signaling rate is used on that link for each bandwidth mode. Consequently, significant latency penalties are not incurred on that link as a result of switching between different bandwidth modes. In this way, strict latency requirements of certain high QoS applications are met while still providing a mechanism to reduce power consumption of the devices, even for cases where the links use calibrated and terminated signaling. In addition, since at least one control link remains enabled for all bandwidth modes, such a control link is advantageously used by the devices in some implementations to synchronize changes in bandwidth modes.

Also, several optional techniques are disclosed for calibrating links when they are disabled so that these links are quickly brought back into service when there is a switch to a higher bandwidth mode. Thus, upon re-enabling a disabled link, the calibration information for the link will be sufficiently up-to-date so that the link can either be used immediately without the need for any further calibration or used after a short delay associated with conducting a minor calibration adjustment (i.e., that takes less time than a full calibration adjustment). In this way, latency penalties that would otherwise be incurred when the links are re-enabled are avoided. That is to say, in some embodiments, links are maintained in a manner where when a higher bandwidth mode is resumed, there is no immediate calibration prerequisite (even for very high speed signaling, e.g., >~5 Gpbs per link). The disclosed calibration techniques also are employed in some embodiments where a lower bandwidth mode involves operating one or more links at a lower signaling rate. Again, this avoids the need for an immediate full calibration procedure when a link is switched back to a higher signaling rate since calibration information is already maintained or available for operating the link at the higher signaling rate. Thus, potential calibration penalties for very high speed operation are mitigated (e.g., eliminated or reduced).

The teaching herein may be implemented using various modes of operation, various techniques for enabling and disabling signaling links, various techniques for operating links at different signaling rates, and various functionality that supports these modes of operation, these techniques for enabling and disabling links, and these techniques for increasing and decreasing link signaling rates. For purposes of illustration, several examples of such variations are described below in the context of embodiments where at least one link is enabled or disabled to change the bandwidth used for information transfers. It should be understood that in other embodiments these examples would involve, for example, increasing or decreasing the signaling rate of at least one link to change the bandwidth used for information transfers.

The description that follows illustrates different implementations that employ a different number of bandwidth modes. Some implementations employ two bandwidth modes: a high bandwidth mode and a low bandwidth mode. Some implementations employ multiple bandwidth modes where all links are enabled for the highest bandwidth mode, one or more of these links are disabled for a lower bandwidth mode, and still more of these links are disabled for an even lower bandwidth mode.

The description that follows also illustrates different implementations that dynamically enable and disable different types of signaling links. In some implementations, both control links and data links are dynamically enabled and disabled depending on the mode of operation. In other implementations, only data links are dynamically enabled and disabled. In still other implementations, only control links are dynamically enabled and disabled. Other types of signaling links also may be dynamically enabled and disabled in accordance with the teachings herein.

Signaling links are enabled and disabled in different ways in different implementations taught herein. In some implementations, each link is enabled and disabled independently of any other link. That is, each link has its own dedicated control signal. Conversely, in other implementations, two or more links are enabled and disabled in unison (e.g., by operation of a single control signal).

Several examples of calibration techniques for disabled links are described herein. Each of these calibration techniques is optional and, therefore, need not be employed in a given implementation.

Different techniques are described for sending control information from one apparatus (e.g., an integrated circuit) to another. In some implementations, all control information is sent over control links that are dynamically enabled and disabled. In other implementations, some control information is sent over one or more sideband links.

The teachings herein are typically implemented in memory components such as a memory controller and a memory device (e.g., a DRAM). These memory components, in turn, are advantageously employed in applications where it is desirable to reduce power consumption as much as possible. For example, a memory system including memory components constructed in accordance with the teachings herein may be incorporated into mobile devices such as cell phones, smart phones, portable computers, personal entertainment devices, and so on. In some embodiments the memory controller and the memory device are embodied in separate integrated circuits. In other embodiments, the memory controller and the memory device are collocated on a single die or a single integrated circuit.

For purposes of illustration, various embodiments are described in the description that follows in the context of a memory system including a first integrated circuit and a second integrated circuit. It should be appreciated that the disclosed concepts may be implemented in other configurations and using other types of apparatuses.

High-Level Embodiment Examples

FIGS. 1A-1D illustrate four different implementations based on the teachings herein. The components of the integrated circuit devices of FIGS. 1A-1D represent functionality implemented in a memory controller device, a memory device, or some other type of device. In general, the described functionality is incorporated into a complementary pair of interconnected devices (e.g., a memory controller device and a memory device) whereby the devices change bandwidth modes in synchronization. In each of FIGS. 1A-1D, the solid blocks represent the main components of that implementation while the dashed blocks represent optional components. Also, in the different figures, similar blocks are identified by similar reference designations (i.e., an A, B, C, or D is appended to a common reference number to distinguish embodiments).

FIG. 1A illustrates a system 100A that employs different bandwidth modes to transfer data between an integrated circuit device 102A and an integrated circuit device 104A. To enable the devices 102A and 104A to efficiently synchronize to any changes in the current bandwidth mode, control information that provides an indication of any transitions in the bandwidth mode is also transferred between the devices 102A and 104A. As used herein, terminology of the form "transfer information between devices" means send information from one device to the other, receive information at a device from another device, or both.

The device 102A includes a data interface circuit 106A for transferring data between the device 102A and the device 104A over a signaling channel comprising a plurality of data links 108A. The data links 108A and any other links described herein are typically implemented as conductive traces mounted on and/or installed within a substrate material such as a printed circuit board or silicon. During a given bandwidth mode, the data is transferred between the devices 102A and 104A via one or more of the plurality of data links 108A. For outgoing data, the device 102A sends data 110A provided by another component (not shown) of the device 102A to the device 104A via the data link(s) 108A. These devices can be, to cite one illustrative example, a memory controller (102A), a host device (not shown) and a DRAM or other memory device (104A). For incoming data, the device 102A receives data from the device 104A via the data link(s) 108A to provide data 110A to another component (not shown) of the device 102A. As discussed in more detail below in conjunction with FIGS. 4A and 4B, individual bits of the data 110A are concurrently routed in parallel over (i.e., across) a number of internal links (e.g., 4) within the device 102A.

The devices 102A and 104A disable one or more of the data links 108A during the lower bandwidth modes. As used herein, terminology of the form "disable a link" means that at least one component used to send information via the link and/or at least one component used to receive information via the link is disabled in some manner (e.g., as discussed in more detail below). The number of data links 108A used to transfer data between the devices 102A and 104A in the different bandwidth modes depends on how the bandwidth modes are configured. Several examples follow. It should be understood that other configurations are possible.

A typical implementation employs two bandwidth modes: a highest possible bandwidth mode and a lowest possible bandwidth mode. In this case, all of the data links 108A (e.g., four links) are enabled for data transfers during the high bandwidth mode and only one of the data links 108A is enabled for data transfers during the low bandwidth mode.

Another implementation employs two bandwidth modes: a highest possible bandwidth mode and a lower (but not the lowest possible) bandwidth mode. In this case, all of the data links 108A are enabled for data transfers during the high bandwidth mode and more than one but less than all of the data links 108A (e.g., two links) are enabled for data transfers during the low bandwidth mode.

Yet another implementation employs three bandwidth modes: a highest possible bandwidth mode, a lower bandwidth mode, and a lowest possible bandwidth mode. In this case, all of the data links 108A are enabled for data transfers during the high bandwidth mode, more than one but less than all of the data links 108A are enabled for data transfers during the lower bandwidth mode, and only one of the data links 108A is enabled for data transfers during the lowest bandwidth mode.

The device 102A includes a control interface circuit 112A for transferring control information between the device 102A and the device 104A. In some aspects, this control information enables the devices 102A and 104A to dynamically synchronize to any changes in the bandwidth mode. For example, in some implementations, upon receiving an indication (e.g., from an associated processor, not shown) that the system 100A is to switch from a higher power mode to a lower power mode, the device 102A commences operations to switch to a lower bandwidth mode. This involves, for example, reconfiguration operations such as disabling one or more of the data links 108A, and invoking at least partial serialization to multiplex the data 110A from the parallel internal links onto fewer links for transmission via the currently enabled data link(s) 108A or invoking at least partial deserialization to demultiplex data received via the currently enabled data link(s) 108A to provide the data 110A on the designated number of parallel internal links. In conjunction with these reconfiguration operations, the device 102A provides an indication of the switch to a lower bandwidth mode, whereby the control interface circuit 112A sends the indication to the device 104A. Upon receiving this indication, the device 104A invokes appropriate reconfiguration operations such disabling one or more of the data links 108A from its end, and invoking appropriate serialization or deserialization to accommodate this disabling of the data link(s) 108A. To this end, the device 104A includes a complementary control circuit (not shown) that generates control signals for controlling these operations based on the received indication.

As discussed in more detail below, in some implementations, the disabling of a link involves one or more of cutting off power to a link transmitter circuit, cutting off power to a link receiver circuit, or disabling a clock signal to a link circuit. Accordingly, the devices 102A and 104A will consume less power in a lower bandwidth mode where one or more links are disabled as compared to a higher bandwidth mode where these links are not disabled.

In some implementations, the control information is transferred between the devices 102A and 104A via one or more control links that are used to carry other control information. For example, in such an implementation where the device 102A embodies a memory controller, the device 104A embodies a memory device, and the memory controller sends instructions and memory addresses over command/address (CA) links to access data from the memory device, the link(s) 114A correspond to these CA links.

The system 100A optionally employs different bandwidth modes to transfer control information between the devices 102A and 104A. In this case, the control interface circuit 112A disables one or more of the links 114A during lower bandwidth modes. The number of links 114A used to transfer control information between the devices 102A and 104A in the different bandwidth modes depends on how the bandwidth modes are configured as discussed above for the data links 108A. The control interface circuit 112A also employs similar functionality as described above (for the data interface circuit 106A) to enable and disable the links 114A. Also, to accommodate the enabling and disabling of the links 114A in this case, the device 102A provides serialization or deserialization (not shown) similar to that described above. Furthermore, the device 104A will include complementary functionality to enable and disable the links 114A from that end and provide appropriate serialization and deserialization to accommodate the manner in which the control information is transferred over the links 114A in the different bandwidth modes.

In other implementations, the control information is transferred between the devices 102A and 104A via one or more sideband links. In such a case, the link(s) 114A correspond to the sideband link(s) and the device 102A transfers other control information (e.g., CA information) via one or more other control links (not shown).

The device 102A optionally includes a control circuit 116A. In some implementations, the control circuit 116A generates control signals 118A. The control signals 118A control the enabling and disabling of the links between the devices 102A and 104A and optionally control the serialization and deserialization of a steering circuit 122A. In some implementations, the control circuit 116A generates control information 120A to be sent to the device 104A and/or processes control information 120A that was received from the device 104A. The control information 120A comprises an indication of a transition to a different bandwidth mode. In some implementations (e.g., where the device 102 is a memory controller), the control circuit 116A generates the control signals 118A and/or the control information 120A as a result of receiving a signal indicating a transition to a higher or lower power mode. For example, this indication could be from a host device such as a master CPU, either coresident with the memory controller or on a separate die from the memory controller. In other implementations (e.g., where the device 102 is a memory device), the control circuit 116A generates the control signals 118A based on a bandwidth mode indication (e.g., an opcode) received from a memory controller.

The device 102A optionally includes a steering circuit 122A that provides serialization and deserialization for data transfers between the data interface circuit 106A and another component (not shown) of the device 102A that sends or receives the data 110A. The steering circuit 122A provides different levels of serialization or deserialization for data bit transfers during different bandwidth modes. For example, during a higher bandwidth mode, the steering circuit 122A concurrently transfers a set of bits in parallel over a plurality of signaling links (i.e., two or more) while, during a lower bandwidth mode, this same set of bits is serially transferred over a common (i.e., the same) signaling link. It should be understood that different parallelization-to-serialization ratios are employed for different bandwidth mode configurations. In a system with 4 links, parallelization-to-serialization link ratios of 4:1, 4:2, 4:3, 3:1, 3:2, and 2:1 are possible. These ratios illustrate that serialization provided by the steering circuit 122A may result in some of the bits being concurrently transmitted over more than one link in some cases. These ratios also illustrate that a parallel transfer provided by the steering circuit 122A involves a transfer over less than all of the available links in some cases. Hence, the terms parallel and serial are relative here. A more detailed example of the functionality of the steering circuit 122A is described below at FIGS. 4A and 4B.

The device 102A optionally includes a calibration circuit 124A for calibrating enabled or disabled links (e.g., updating timing adjustment value(s) for these links). Examples of the functionality of the calibration circuit 124A are described in conjunction with FIG. 1B that follows.

Figure 1B:
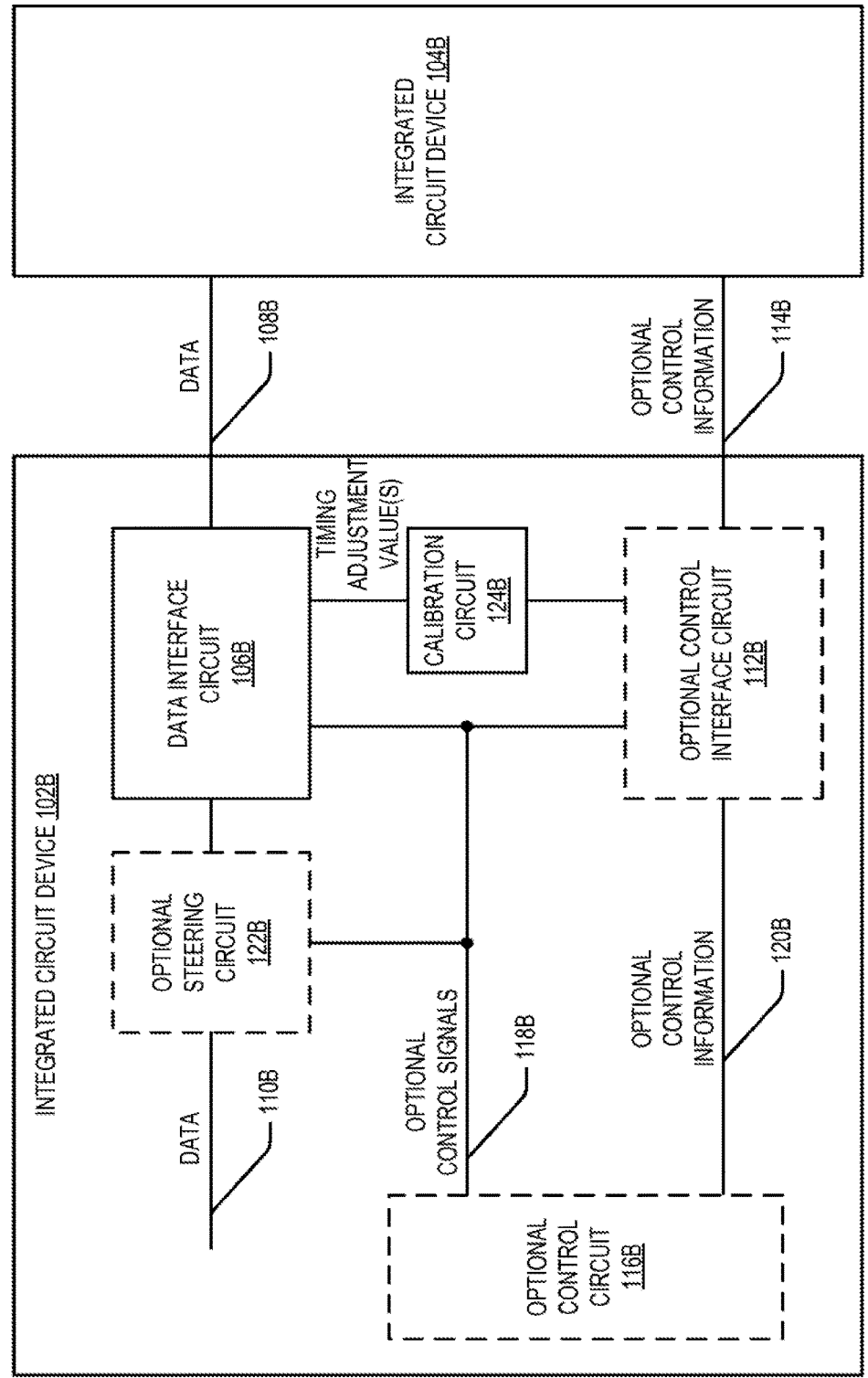

System 100B of FIG. 1B illustrates an implementation that employs a calibration circuit 124B to update calibration-related information for links. As in the system 100A, this implementation employs different bandwidth modes to transfer data between an integrated circuit device 102B and an integrated circuit device 104B via data links 108B. Thus, whenever one of the data links 108B is disabled during a lower bandwidth mode, the calibration circuit 124B keeps the calibration for this link up-to-date. This, in turn, enables the link to be quickly brought back into service when there is a switch to a higher bandwidth mode since the link will not need further calibration or will be fully calibrated upon invocation of a relatively short calibration procedure.

The calibration circuit 124B generates timing adjustment values (e.g., phase information) for each of the data links 108B. The timing adjustment value for a given link specifies a phase shift to be imparted on a signal on that link. In the example of FIG. 1B, this phase shift is imparted by a component of the data interface circuit 106B as described in more detail below at FIGS. 6 and 13. In a typical implementation, a unique timing adjustment value is generated for each link. In other implementations, two or more links (e.g., links with matched trace routing on a printed circuit board) use the same timing adjustment value.

Examples of calibration operations performed by the calibration circuit 124B include: 1) updating timing adjustment values for a disabled link based on timing adjustment values generated for an enabled link; 2) temporarily enabling a disabled link during a lower bandwidth mode to calibrate the link; or 3) calibrating a disabled link just before a switch to a higher bandwidth mode that uses the link. These calibration operations are described in more detail below at FIGS. 5-8. In each of these embodiments, the calibration circuit 124B can also optionally be used to periodically calibrate enabled links.

The integrated circuit device 102B optionally includes a control interface circuit 112B for transferring control information between the device 102B and the device 104B via link(s) 114B, where the control information provides an indication of transitions in the bandwidth mode. As discussed above, such an indication is employed to dynamically synchronize changes in the bandwidth mode employed at a given point in time by the devices 102B and 104B. The link(s) 114B comprise one or more sideband links or some other type of link (e.g., CA links).

The calibration circuit 124B optionally updates calibration-related information for any control links that are disabled. Calibration of disable control links is provided, for example, in a implementation that employs a control interface circuit 112B that dynamically enables and disables links 114B to provide different bandwidth modes for transferring control information between the devices 102B and 104B as described above for FIG. 1A.

The integrated circuit device 102B also optionally includes a control circuit 116B and/or a steering circuit 122B. The operations of these components correspond to the corresponding components described above at FIG. 1A and include, for example, generating or using control signals 118B and generating or using control information 120B.

Figure 1C:
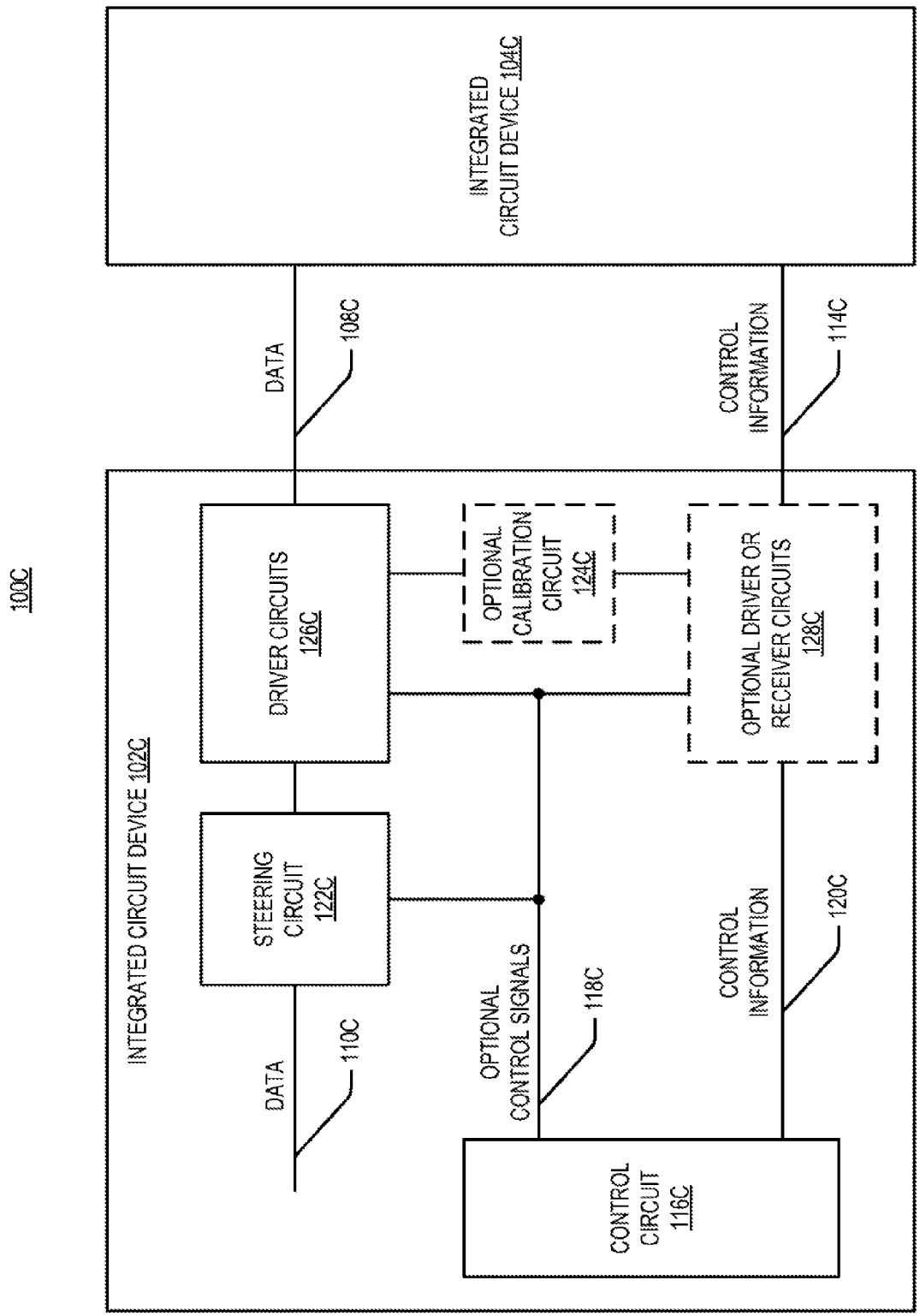

System 100C of FIG. 1C illustrates an implementation that employs individually enabled parallel drivers tied to serialization gearing to provide different bandwidth modes, where control information transferred between devices provides an indication of transitions in the bandwidth mode. An integrated circuit device 102C includes driver circuits 126C that transfer data to an integrated circuit device 104C via a plurality of signaling links 108C. Each driver circuit 126C is enabled or disabled based on a control signal provided to that driver circuit. It should be understood that even though the drivers are individually enabled and disabled, in some implementations a single control signal is used to enable and disable a group of drivers.

A steering circuit 122C selects between: 1) concurrently routing data 110C in parallel to all of the driver circuits 126C (e.g., that drive four signaling links: links 0-3) if all of the driver circuits 126C are enabled; and 2) employing serialization to route the data 110C to a first subset of the drivers circuits 126C (e.g., that drives link 0) if a second subset of the driver circuits 126C (e.g., that drive links 1-3) are disabled. In this way, the device 102C provides outgoing data (e.g., for a write operation) to the currently enabled driver circuits 126C which then drive the data on the appropriate signaling links 108C for a given bandwidth mode. The steering circuit 126C performs complementary operations to provide the data 110C (e.g., for a read operation) when receiving data from the device 104C via independently enabled parallel receiver circuits (not shown) coupled to the signaling links 108C. It should be understood that the above-described act of selecting between routing data to all drivers circuit and routing data to a first subset of the data circuits does not preclude the use of at least one other optional selection to route data to some other subset. Also, it should be understood that the terms parallel and serial (and serialization) are relative terms. "Parallel" routing mentioned above may include sets of bits that are serially transmitted on a given link; "serialization" refers to the notion that when one or more links are disabled, the same volume of data is generally transmitted responsive to a command using a relatively smaller number of links, and thus involves a greater degree of serialization than when the same data is conveyed across in a more distributed manner, via a larger number of links.

A control circuit 116C transfers (i.e., sends and/or receives) the above-referenced control information between the device 102C and 104C. In some implementations where the device 102C is a memory controller, the control circuit 116C generates the control information 120C that is sent to the device 104C via control link(s) 114C to provide an indication of a transition in the bandwidth mode. In some implementations where the device 102C is a memory device, the control circuit 116C receives the control information 120C that is sent from the device 104C via the control link(s) 114C and optionally uses this information to generate control signals 118C that configure the steering circuit 122C and the driver circuits 126C for the designated bandwidth mode.

The device 102C optionally includes parallel driver or receiver circuits 128C tied to serialization for transferring control information between the device 102 and the device 104B via link(s) 114; the driver or receiver circuits 128C are independently enabled to provide different bandwidth modes for control information transfers. The circuits 128C comprise driver circuits, for example, in an implementation where the device 102C is a memory controller that sends control information to a memory device. The circuits 128C comprise receiver circuits, for example, in an implementation where the device 102C is a memory device that receives control information from a memory controller.

The device 102A optionally includes a calibration circuit 124C for calibrating disabled links. The functionality of the calibration circuit 124C corresponds to the functionality of the calibration circuit 124B discussed above. The calibration circuit 124C optionally updates calibration-related information for any control links that are disabled. Calibration of disable control links is provided, for example, in a implementation that employs driver or receiver circuits 128C that dynamically enable and disable links 114C to provide different bandwidth modes for transferring control information between the devices 102C and 104C.

Figure 1D:
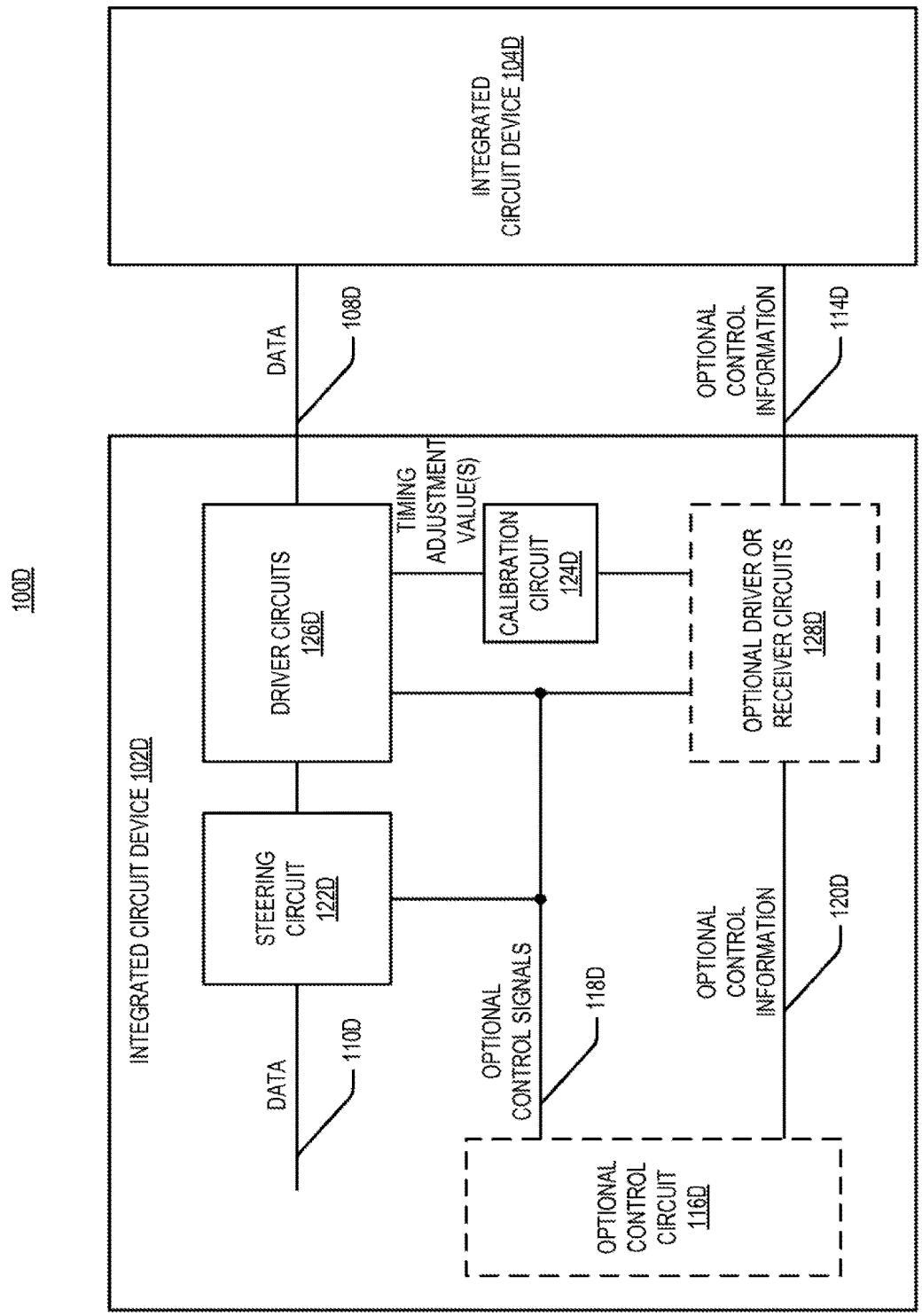

System 100D of FIG. 1D illustrates an implementation that employs a calibration circuit 124D to update calibration-related information for disabled links. As in the system 100C, an integrated circuit device 102D includes independently enabled driver circuits 126D that transfer data to an integrated circuit device 104D via different signaling links 108D in different bandwidth modes. Thus, the calibration circuit 124D updates timing adjustment values for any driver circuits 126D that are disabled during a lower bandwidth mode. The calibration circuit 124D performs calibration procedures as discussed above in conjunction with FIG. 1B. The device 102D also includes a steering circuit 126D that corresponds to the steering circuit 126C of FIG. 1C. Thus, the steering circuit 126D provides serialization, as necessary, for outgoing data 110D to route the data to the currently enabled driver circuits 126C for a given bandwidth mode, and optionally provides deserialization for incoming data received via independently enabled receiver circuits (not shown).

The device 102D optionally includes driver or receiver circuits 128D for transferring control information between the device 102D and the device 104D via link(s) 114D, where the control information provides an indication of transitions in the bandwidth mode. As discussed above, such an indication is employed to dynamically synchronize changes in the bandwidth mode employed at a given point in time by the devices 102D and 104D. The link(s) 114D comprise one or more sideband links or some other type of link (e.g., CA links).

The calibration circuit 124D optionally updates calibration-related information for any control links that are disabled. Calibration of disabled control links is provided, for example, in an implementation that employs driver or receiver circuits 128D that dynamically enable and disable links 114D to provide different bandwidth modes for transferring control information between the devices 102D and 104D.

The device 102D optionally includes a control circuit 116D that corresponds to the control circuit 116C of FIG. 1C. Thus, in some implementations, the control circuit 116D generates control signals 118D for controlling the steering circuit 122D and driver circuits (and, optionally receiver circuits) of the device 102D. In addition, in some implementations, the control circuit 116D generates the control information 120D that is sent to the device 104D or processes the control information 120D that is received from the device 104D.

High-Level Operation Examples

Figure 2:
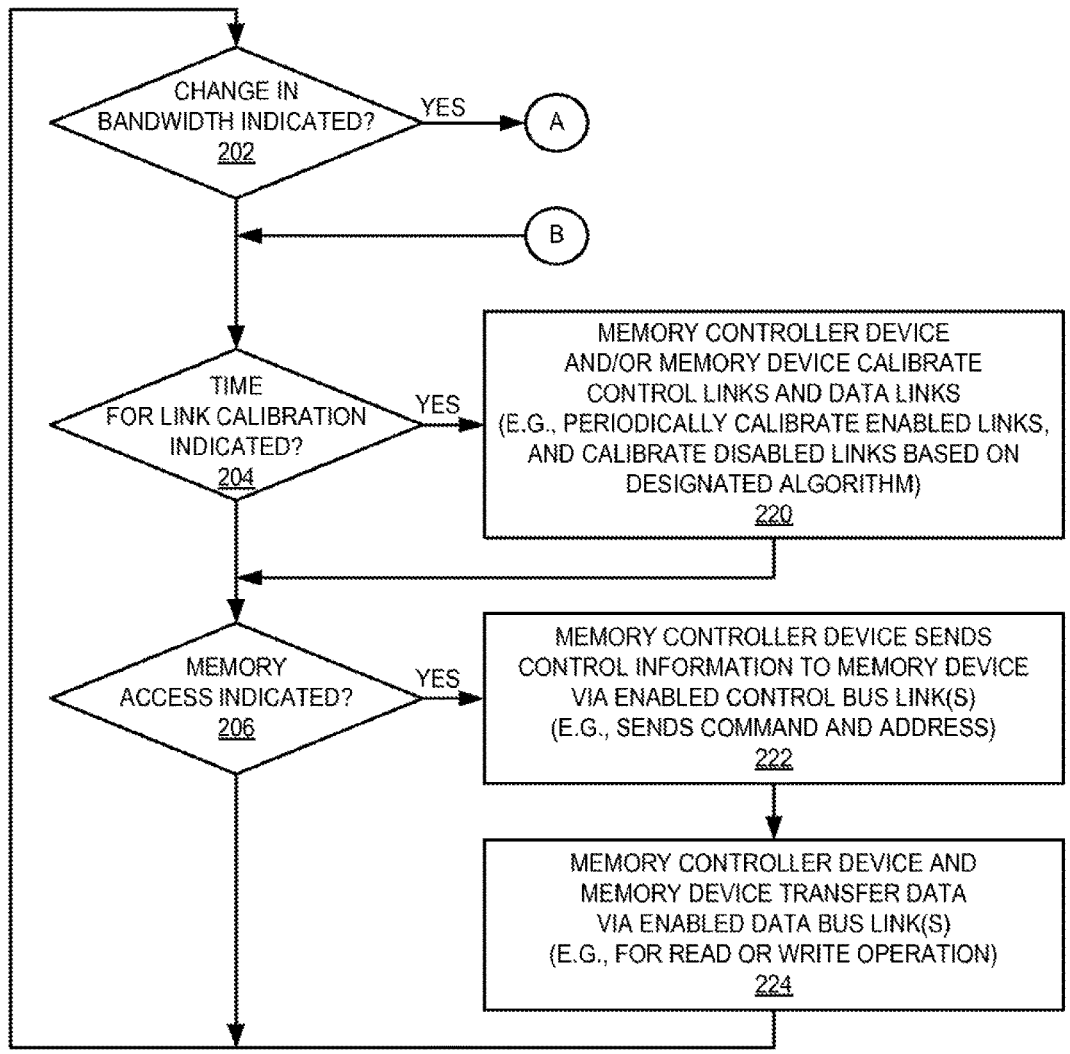
FIGS. 2 and 3 are a flowchart of an embodiment of operations performed in conjunction with dynamically changing memory access bandwidth.
Figure 3:
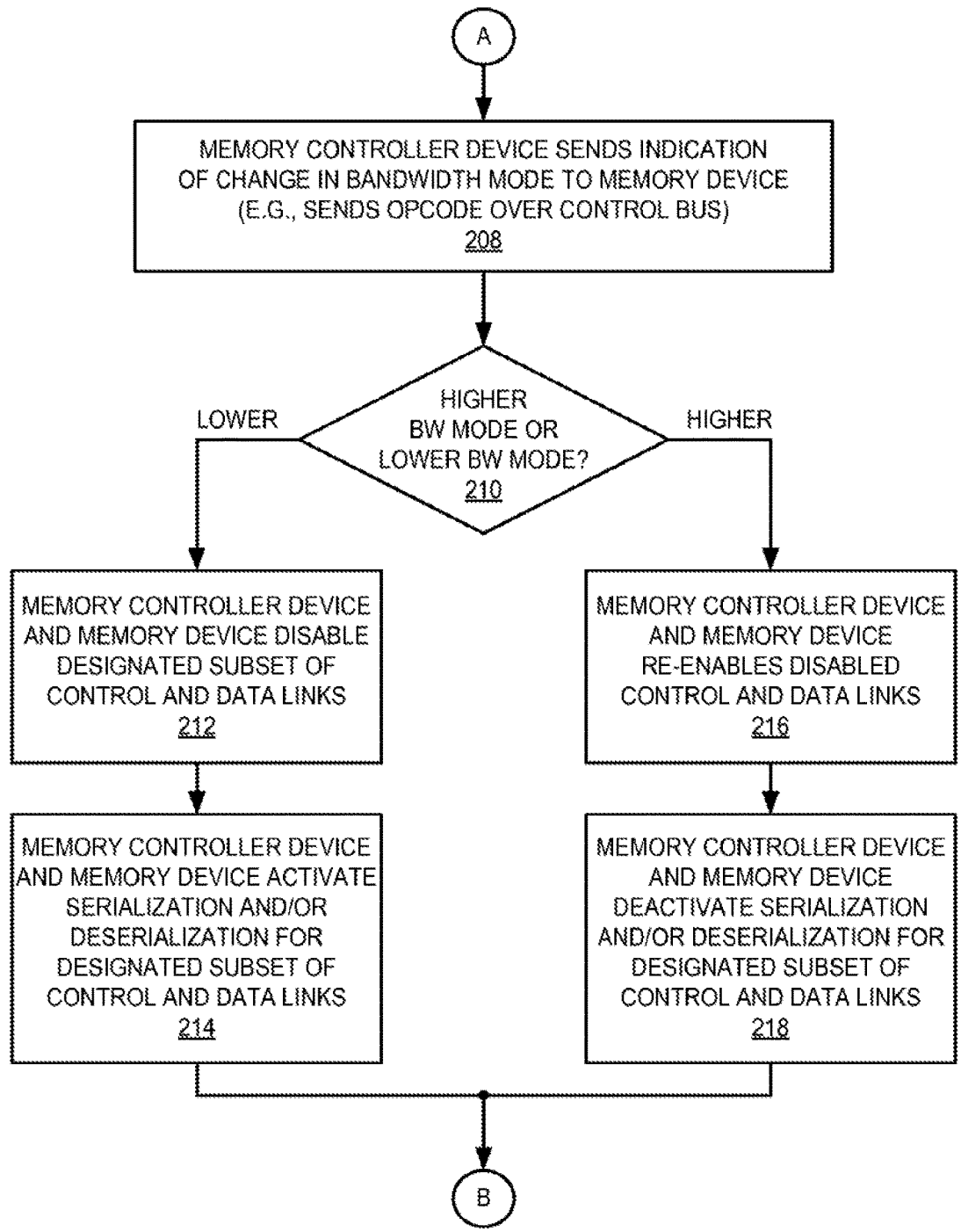

The flowchart of FIGS. 2 and 3 describes sample high-level operations that a memory controller device and a memory device perform to support a dynamic bandwidth scheme as taught herein. Briefly, blocks 202-206 of FIG. 2 represent a call flow loop at the memory controller device and/or the memory device whereby in response to a particular trigger, either a bandwidth switch operation, a link calibration operation, or a memory access operation is commenced. These operations are triggered, for example, by receipt of a signal, by expiration of a timer, by an interrupt mechanism, or by a polling mechanism. In response to such a trigger, a given operation is performed autonomously (e.g., by a state machine or other circuitry) or conditionally (e.g., upon invocation of a software function or other suitable function).

For convenience, the operations of FIGS. 2 and 3 (or any other operations discussed or taught herein) are described as being performed by specific components (e.g., the components of FIG. 1) in some instances. It should be appreciated, however, that these operations may be performed by other types of components and using a different number of components. It also should be appreciated that one or more of the operations described herein may not be employed in a given implementation.

Block 202 of FIG. 2 relates to determining whether a change in bandwidth modes is called for and, if so, invoking the operations of FIG. 3 to accomplish this change. A change in such an operational mode is triggered at the system level in some cases. For example, a mode change is triggered directly by a command from an application in some embodiments. In other embodiments, a mode is selected by the operating system in response to observed characteristics (e.g., automatically based on memory usage statistics or another parameter exhibited by an application or activity).

The memory controller device determines whether a change in bandwidth needs to be made based on a corresponding indication provided at the memory controller device. Such an indication indicates that an associated system on a chip (SoC) is transitioning from a high power mode to a low power mode or vice versa in some cases. In some implementations, this indication takes the form of a signal that the memory controller device receives (e.g., from another component of an SoC) wherein the signal is indicative of the change in power mode. The receipt of such a signal triggers certain bandwidth switching-related actions at the memory controller device such as, for example, the generation of enable control signals, serializer control signals, and other signals at appropriate times. In some implementations, a change in power mode is indicated by a change in the state of a register value. Upon detecting this change in state (e.g., by polling the register), appropriate bandwidth switching-related actions are triggered at the memory controller device.

As represented by block 208 of FIG. 3, upon determining that a change in bandwidth is indicated, the memory controller device sends an indication of this bandwidth change to the memory device. In some implementations, the memory controller device sends an opcode or other information indicative of a transition from a low bandwidth mode to a high bandwidth mode or vice versa to the memory device via a control bus (e.g., a CA bus). In other implementations, the memory controller device sends an indication of such a transition to the memory device via a sideband signal path.

In either case, the memory device determines that a change in bandwidth needs to be made based on the receipt of the indication from the memory controller device. Upon receipt of this indication, appropriate bandwidth switching-related actions (e.g., the generation of control signals) are triggered at the memory device.

As represented by block 210, depending on whether the change in bandwidth is from a high bandwidth mode to a low bandwidth mode or vice versa, the operational flow proceeds to either block 212 or block 216, respectively, to configure the memory controller device and the memory device for the new bandwidth mode. Delays may be employed at these devices to ensure that any data transfer operations associated with the previous bandwidth mode are completed before the devices are reconfigured for the new bandwidth mode. In addition, the memory controller device delays for an appropriate period of time after sending the indication of block 208 to ensure that the memory device is aware of the change in bandwidth mode.

For a transition to a low bandwidth mode, as represented by block 212, the memory controller device and the memory device disable a designated subset of the control and data links. In addition, as represented by block 214, the memory controller device and the memory device activate the appropriate serialization or deserialization functionality to send or receive information in series over the enabled link(s) rather than the disabled links.

For a transition to a high bandwidth mode, as represented by block 216, the memory controller device and the memory device re-enable any previously disabled control and data links. In addition, as represented by block 218, the memory controller device and the memory device redefines the serialization or deserialization functionality so that information will be sent in greater distribution, across all of the links.

Block 204 of FIG. 2 relates to determining whether disabled links need to be calibrated and, if so, performing the calibration operations of block 220. These operations are triggered, for example, by a timer or other signaling mechanism that ensures that the calibration operations are performed with sufficient frequency or at a designated time. For example, in some implementations calibration operations are performed on a repeated basis (e.g., periodically) for each enabled link to ensure that the signal timing of the link is properly compensated for changes in propagation delay (or other parameters) due to temperature drift or some other dynamic condition. Moreover, calibration operations are performed for each disabled link using, for example, one of the calibration operations described below at FIGS. 5-8. Typically, the link calibration operations are performed at the memory controller device. However, these operations are performed at some other entity (e.g., at the memory device) in some cases.

Block 206 of FIG. 2 relates to determining whether a memory access is to be performed and, if so, conducting this access at the currently designated bandwidth. This operation is triggered at the memory controller device, for example, as a result of receiving a memory request from a processing entity (e.g., received from a component of an associated SoC or received from processor residing on another integrated circuit).

As represented by block 222, to commence a memory access, the memory controller device sends appropriate control information (e.g., a memory command and associated address) to the memory device. As discussed in more detail below, this control information will be sent over the control links that are enabled for the current bandwidth mode. Upon receipt of this control information, the memory device commences appropriate operations to service the memory access. Accordingly, as represented by block 224, the memory controller device and the memory device transfer the data designated by the memory request over the data links that are enabled for the current bandwidth mode.

Detailed Memory System Example

A detailed example of a memory controller device and a memory device incorporating the teachings herein will now be described with reference to FIG. 4A and FIG. 4B, respectively. For purposes of illustration, sample operations of these components are described for a configuration where both the data links and the control links operate in either a high bandwidth mode or a low bandwidth mode, and where calibration is provided for disabled links. It should be understood based on the discussion above that the details of FIGS. 4A and 4B are also applicable to implementations that employ a different configuration.

Figure 4A:
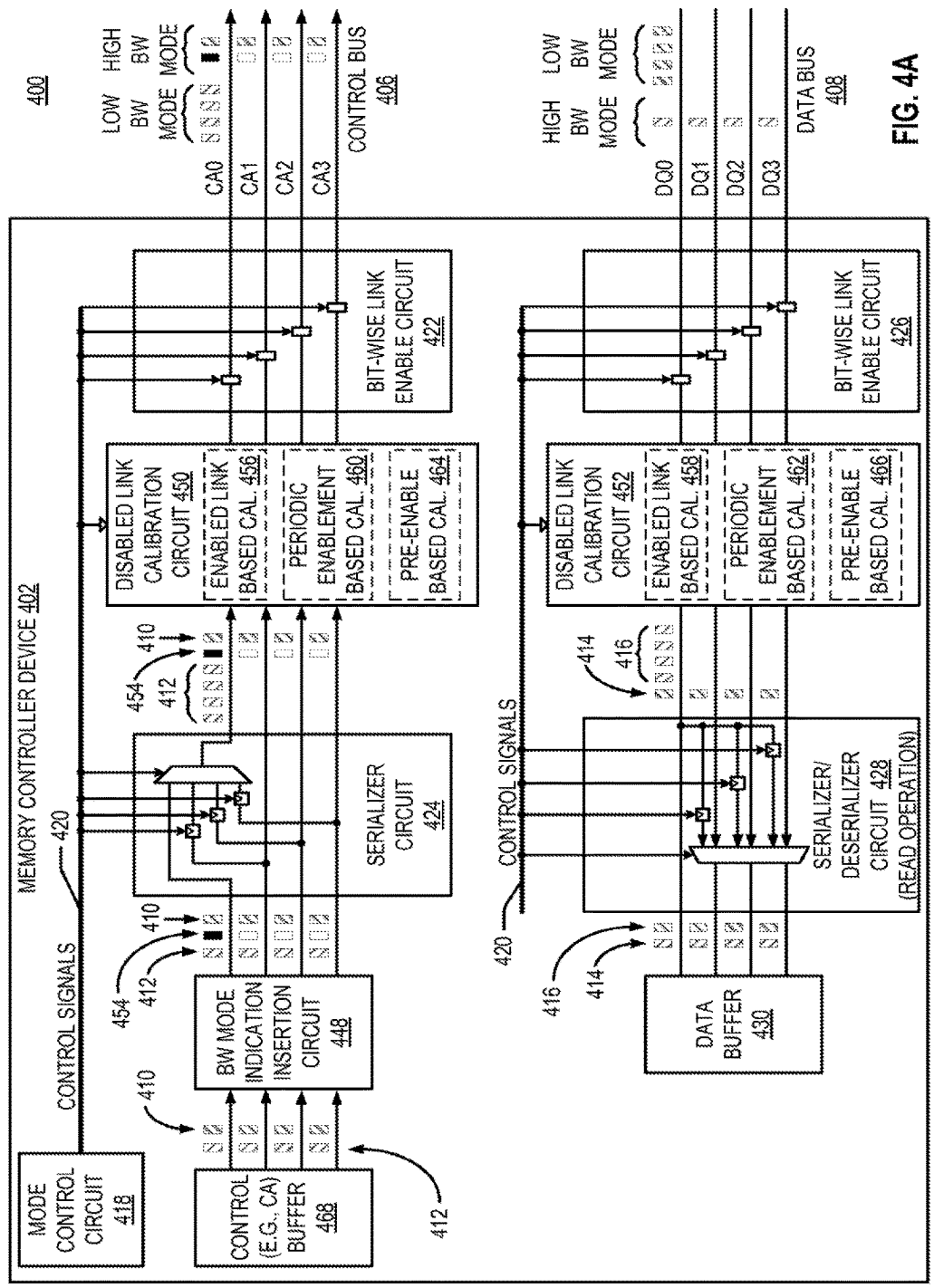
FIG. 4A is a simplified block diagram of an embodiment of a memory controller device that illustrates an example of dynamically enabling and disabling individual links and dynamically changing serialization gearing.
Figure 4B:
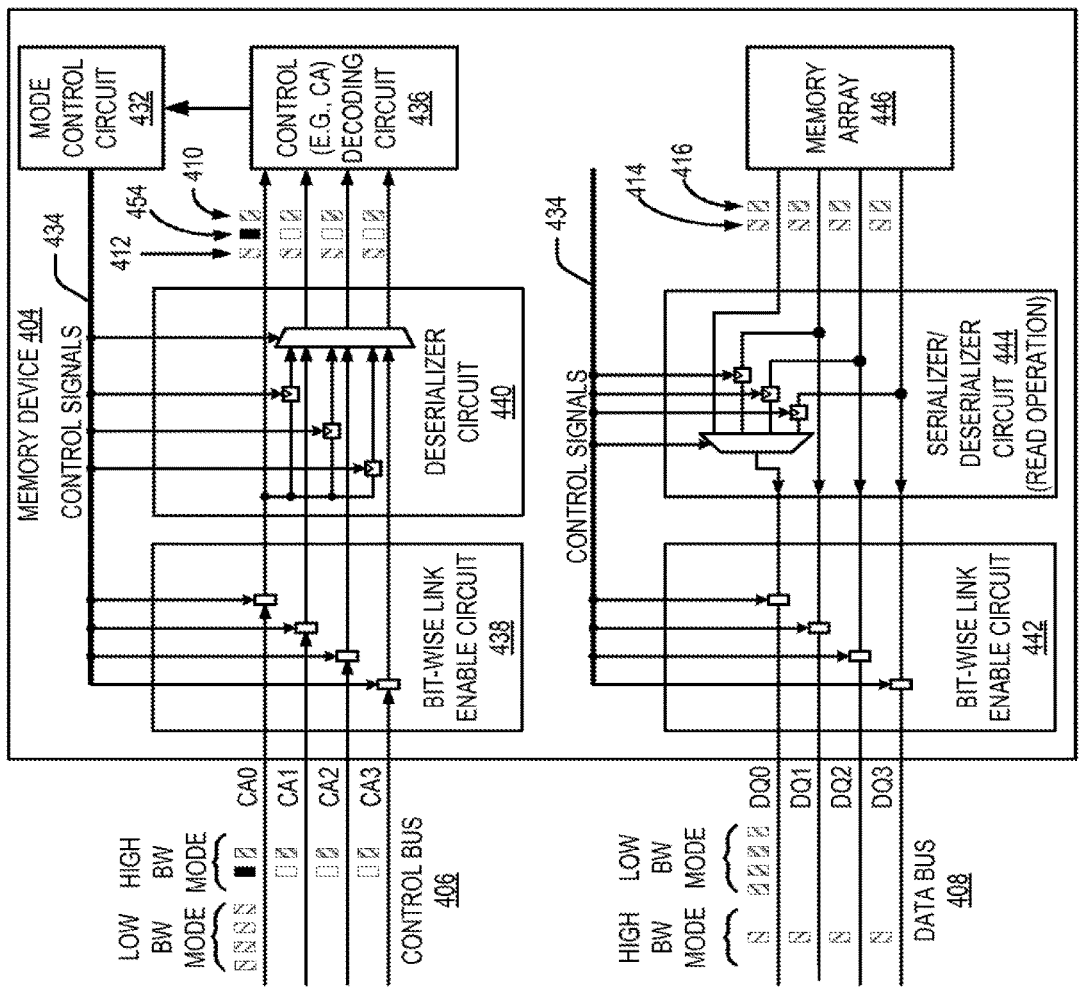
FIG. 4B is a simplified block diagram of an embodiment of a memory device that illustrates an example of dynamically enabling and disabling individual links and dynamically changing serialization gearing.

FIGS. 4A and 4B depict an embodiment of a memory system 100 where a memory controller device 402 (FIG. 4A) communicates with a memory device 404 (FIG. 4B) via a control bus 406 and a data bus 408. In accordance with conventional techniques, the memory controller device 402 sends command and address information over the control bus 406 to the memory device 404 to initiate a data transfer on the data bus 408.

The control bus 406 and the data bus 408 each comprise a set of four links in this embodiment. Each of these links is individually enabled and disabled (e.g., by enabling/disabling the transmitter and receiver for the link) based on the current power mode in the system 100. For example, in some embodiments the memory controller device 402 resides within an SoC (not shown) that supports multiple power modes. In such a case, the SoC operates in a high power mode when processing requirements are high (e.g., a computationally intensive user application is running) and operates in one or more lower power modes when processing requirements are lower (e.g., no or few user applications are running). A signal indicative of the current power mode is provided to components of the SoC so that these components will take action to reduce their power consumption, if needed. In response to changes in such a signal (not shown), the memory controller device 402 and the memory device 404 dynamically change the bandwidth used on the control bus 406 and the data bus 408. As discussed in more detail below, a change in this bandwidth causes a corresponding change in power consumption at these devices.

FIGS. 4A and 4B also depict information flow for two bandwidth modes and examples of components that provide functionality for switching between these bandwidth modes. Bit-wise link enable circuits (e.g., individually controllable driver and receiver circuits) are employed to enable all four links on each bus during a high bandwidth mode and disable three of the four links on each bus during a low bandwidth mode in the illustrated example. Disabled link calibration circuits are employed to calibrate disabled links during the low bandwidth mode using one of several calibration schemes described herein. Serializer and deserializer circuits are employed to route information in parallel over all four links during the high bandwidth mode and route information in series over the single enabled link during the low bandwidth mode. For example, FIGS. 4A and 4B illustrate control packets 410 being sent in parallel over the control bus 406 during the high bandwidth mode and control packets 412 being sent in series over the control bus 406 during the low bandwidth mode. Similarly, data packets 414 are sent in parallel over the data bus 408 during the high bandwidth mode and data packets 416 are sent in series over the data bus 408 during the low bandwidth mode. As discussed below, the above link enable, link calibration, and serializer-related functionality is typically implemented within other components (e.g., a PHY and a steering circuit or multiplexer) of a memory controller device and a memory device.

As mentioned above, the references herein to sending information in parallel and in series are relative in nature. That is, some serialization of the data bits of a packet is typically employed to send the packet over a bus irrespective of the current bandwidth mode. For example, in the high bandwidth mode, a 20 bit packet is sent in five successive 4-bit wide transfers over CA0-3 (or DQ0-3). Thus, some serialization is employed at the memory controller device 402 to provide the 5 successive bits on each link. Conversely, in the low bandwidth mode, a 20 bit packet is sent in 20 successive 1-bit wide transfers over a single line (e.g., CA0). Thus, the low bandwidth mode involves "more" serialization than the high bandwidth mode. In addition, a reference herein to sending information in parallel (i.e., concurrently over a set of parallel links) means that the information as a whole (e.g., an entire packet) is sent at least partially in parallel.

At the memory controller device 402, a mode control circuit 418 generates control signals 420 for controlling the bandwidth switching functionality based on a power mode indication (or some other suitable indication) at the memory controller device 402 (e.g., based on signal received from an SoC component). For example, upon receiving an indication that the system 400 is a high power mode, the control signals 420 are set to a state that configures the link enable and serializer-related circuits of the memory controller device 402 to support high bandwidth information transfers to and from the memory device 404. Conversely, upon receiving an indication that the system 400 is a low power mode, the control signals 420 are set to a state that configures the link enable and serializer-related circuits to support low bandwidth information transfers to and from the memory device 404.

Several of the control signals 420 control the operation of a bit-wise enable circuit 422 that selectively enables and disables driver circuits for the links (CA0-CA3) of the control bus. A separate control signal is provided for each driver circuit on each control link. Thus, all of the control links may be enabled for the high bandwidth mode and any one of the control links may be disabled for the low bandwidth mode. The operational flow described in FIGS. 4A and 4B involve a scenario where the low-bandwidth mode enables ¼ of the links and disables ¾ of the links. Other embodiments may utilize a different ratio, such as ½-½, ⅛-⅞, etc.

Some of the control signals 420 control the operation of a serializer circuit 424. During the low bandwidth mode, the serializer circuit 424 serializes (i.e., provides for increased serialization of) the data bits output by a control buffer 468 on parallel links so that these data bits are output by the serializer circuit 424 over a relatively smaller number of links. During the high bandwidth mode, the serializer circuit 424 passes the data bits without this added serialization (i.e., the serializer circuit 424 receives and outputs the data bits over the same number of links). In the example shown in FIG. 4A, the control buffer 468 outputs a set of four control packets 410 in parallel on four control links. Three of the control signals 420 control latches that latch the control packets 410 for the bottom three control links (CA1-CA3) at a specified point in time. Another one of the control signals 420 controls a multiplexer to output the control packet for the topmost control link and the latched control packets in sequence on the CA0 control link.

Another subset of the control signals 420 control the data path section of the memory controller device 402. To reduce the complexity of FIG. 4, the details of the serializer/deserializer circuits for the data path are only shown for the read direction. It should be appreciated that serializer/deserializer circuits similar to those shown for the control path are employed for the data path for the write direction.

Several of the control signals 420 control the operation of a bit-wise enable circuit 426 that selectively enables and disables receiver circuits for the links (DQ0-DQ3) on the data bus. A separate control signal is provided for each receiver circuit on each data link. In the current example, all of the data links are enabled for the high bandwidth mode and three of the data links are disabled for the lower bandwidth mode. It should be appreciated, however, that the system 400 is operable with any combination of enabled and disabled links.

Some of the control signals 420 control the operation of a serializer/deserializer circuit 428. The serializer/deserializer circuit 428 deserializes the read data output by the bit-wise enable circuit 426 during the low bandwidth mode and passes the data bits without this added serialization during the high bandwidth mode. During the low bandwidth mode, the bit-wise enable circuit 426 outputs a set of four data packets 416 in series on the DQ0 data link. In this case, three of the control signals 420 control latches that latch three of these data packets in sequence. Another one of the control signals 420 controls a multiplexer to output the latched packets on the bottom three data links (DQ1-DQ3) at a specified point in time to provide a data packet 414 in parallel for the data buffer 430. Thus, the four data packets 416 that were received by the serializer/deserializer circuit 428 sequentially on DQ0 are provided in a more distributed manner across DQ0-DQ3 (one packet on each link) to the data buffer 430.

At the memory device 404 of FIG. 4B, a mode control circuit 432 generates control signals 434 for controlling bandwidth switching functionality. As discussed herein, the control signals 434 are generated based on a bandwidth mode indication (e.g., an opcode) received from the memory controller device 402 and decoded by a control decoding circuit 436. Based on the state of the control signals 434, the link enable and serializer-related circuits of the memory device 404 are configured to support high or low bandwidth information transfers to and from the memory controller device 402.

The control bus path for the memory device 404 is similar to the receive data path for the memory controller device 402 described above. Thus, several of the control signals 434 control the operation of a bit-wise link enable circuit 438 that selectively enables and disables receiver circuits for the links of the control bus 406. In addition, several of the control signals 434 control the operation of a deserializer circuit 440. In the example of FIG. 4B, during the low bandwidth mode, the deserializer circuit 440 deserializes a set of four control packets received by the bit-wise enable circuit 438 in series on the CA0 link. Again, three of the control signals 434 control latches and one of the control signals 434 controls a multiplexer to provide a control packet 412 in parallel for the control decoding circuit 436.

The read data bus path for the memory device 404 as depicted in FIG. 4B is similar to the transmit control bus path for the memory controller device 402 described above. Thus, several of the control signals 434 control the operation of a bit-wise enable circuit 442 that selectively enables and disables drive circuits for the links of the data bus 408. In addition, several of the control signals 434 control the operation of a serializer/deserializer circuit 444 that serializes a set of four read data packets 416 that are output in parallel by a memory array 446 during the low bandwidth mode. Three of the control signals 434 control latches and one of the control signals 434 controls a multiplexer to output the data packets in series on the DQ0 data link during the low bandwidth mode as shown in FIG. 4B.

With the above in mind, examples of information flow during high and low bandwidth modes and during bandwidth mode switching operations will now be described in more detail. Initially, a description of the flow of control information and data during the high bandwidth mode is provided. Next, the process of configuring the memory controller device 402 and the memory device 404 for the low bandwidth mode is described, followed by a description of the flow of control information and data during this low bandwidth mode.

In conjunction with the memory controller device 402 initiating a memory access operation, a control (e.g., command/address) buffer 468 outputs control information (hereafter referred to as the control packets 410) destined for the memory device 404. In this context, the term packet refers to a set of bits that include one or more defined bit fields for different types of information. In a sample implementation, the memory controller device 402 invokes a read operation by sending a set of three packets. Each of these packets is a defined number of bits (e.g., 12 bits) in length. The first packet includes, for example, a bit field for the command (e.g., an opcodes corresponding to a read command), a bit field for a bandwidth mode indication, a bit field for a row address, a bit field for a bank address, and spare bit fields as necessary. The second packet includes, for example, a bit field for a first portion of the column address and spare bit fields. The third packet includes, for example, a bit field for a second portion of the column address, a bit field for other information, and spare bit fields. The memory controller device 402 transmits the packet over the control bus 406 by sending certain bits over certain links in succession (e.g., every third bit goes on CA0). Since the bit fields in a given type of packet are always in the same place within the packet, in some implementations the memory controller device 402 always sends a given bit in a packet via the same CA link. Thus, the memory device can always expect to see, for example, the bandwidth mode indication on the same control link (e.g., CA0). Upon receiving the packets associated with a given operation, the memory device 404 parses the information from the bit fields to identify the requested operation, the target address, and any other operational parameters specified for that operation.

In the high bandwidth mode, the control packets 410 are routed in parallel over four links to the bit-wise link enable circuit 422 that drives the control bus 406. Also during this mode, all of the links of the control bus 406 are enabled such that the control packets 410 are routed in parallel over the control bus 406 as shown in FIG. 4A. The bandwidth mode indication insertion circuit 448, the serializer circuit 424, and the disabled link calibration circuit 450 do not have any substantive effect on the control packets 410 during the high bandwidth mode.

At the memory device 404, the control packets 410 are received by the bit-wise link enable circuit 438. Again, all of the links are enabled for the high bandwidth mode. As shown in FIG. 4B, the control packets 410 are routed in parallel over four links to the control decoding circuit 436. The deserializer circuit 440 does not have any substantive effect on the control packets 410 during the high bandwidth mode.

The control decoding circuit 436 processes the received control information to determine what action is to be taken by the memory device 404. For example, upon receipt of a write or read command, the control decoding circuit 436 takes action to commence the transfer of data to/from a specified memory address from/to the memory controller device 402.

For purposes of explaining a data transfer during the high bandwidth mode, it is assumed that the control packets 410 comprise a read command. In this case, the memory array 446 outputs read data (hereafter referred to as the data packets 414) to be sent to the memory controller device 402. The data packets 414 are routed in parallel over four links to the bit-wise link enable circuit 442 that drives the data bus 408 during a read operation. During the high bandwidth mode, all of the links of the data bus 408 are enabled such that the data packets 414 are routed in parallel over the data bus 408 as shown. The serializer/deserializer circuit 444 does not have any substantive effect on the data packets 414 during the high bandwidth mode.

At the memory controller device 402, the data packets 414 are received by the bit-wise link enable circuit 426. As shown in FIG. 4A, the data packets 414 are routed in parallel over four links to the data buffer 430. The serializer/deserializer circuit 428 and the disabled link calibration circuit 452 do not have any substantive effect on the data packets 414 during the high bandwidth mode.

In the event there is a need to switch to the low bandwidth mode (e.g., as indicated by a transition to a lower power mode by an SoC), the mode control circuit 418 changes the state of the control signals 420 to indicate the new bandwidth mode. This change in state will, in turn, result in reconfiguration of the link enable circuits, the serializer-related circuits, and the link calibration circuits of the memory controller device 402 as discussed below.

Initially, however, upon receiving an indication of a change in the bandwidth mode (from high to low or vice versa), the bandwidth (BW) mode indication insertion circuit 448 inserts an indication of this bandwidth mode switch into a control signaling path to cause this indication to be delivered to the memory device 404. The insertion of the indication may be achieved in various ways including, for example, inserting the indication into a buffer (e.g., a command queue) or using a multiplexer to switch the indication into a control signal path. In FIG. 4B, the BW mode indication (represented by the solid black packet 454) is shown as being inserted into the control bus path. For example, in some implementations the indication takes the form of an opcode that is interpreted by the control decoding circuit 436 of the memory device 404. It should be appreciated, however, that in other implementations such an indication is sent to a memory device via some other path (e.g., via one or more sideband signals) and/or destined for some other control circuit of the memory device 404.

Advantageously, the BW mode indication is sent to the memory device 404 via a link that is always enabled (e.g., the CA0 link). In this way, regardless of the current bandwidth mode, the memory device 404 will be able to receive this indication.

After the BW mode indication has been sent to the memory device 404, the link enable circuits, the serializer-related circuits, and the link calibration circuits of the memory controller device 402 are reconfigured to support low bandwidth information transfers to and from the memory device 404. Specifically, the link enable circuits 422 and 426 disable the bottom three links of the control bus 406 and the data bus 408, respectively. In addition, the serializer circuit 424 is configured to serialize all control packets for transmission over the remaining enabled link, while the serializer/deserializer circuit 428 is configured to serialize data packets destined for the memory device 104 and deserialize read data packets received from the memory device 404. Finally, the link calibration circuits 450 and 452 are configured to calibrate the disabled links using a specified algorithm.

Referring now to the operations of the memory device 404, the BW mode indication sent over the control bus 406 is received by the control decoding circuit 436 in a similar manner as discussed above for the control packets 410. Upon receiving this indication, the control decoding circuit 436 changes the state of the control signals 434 to indicate the new bandwidth mode (e.g., the low bandwidth mode). This change in state will, in turn, result in reconfiguration of the link enable circuits and the serializer-related circuits of the memory device 404. Specifically, the link enable circuits 438 and 442 disable the bottom three links of the control bus 406 and the data bus 408, respectively. In addition, the deserializer circuit 440 is configured to deserialize all control packets received via the remaining enabled link, while the serializer/deserializer circuit 444 is configured to serialize read data packets destined for the memory controller device 402 and deserialize write data packets received from the memory controller device 402.

An example of an information transfer over the control bus 406 and the data bus 408 for the low bandwidth mode will now be described. As mentioned above, the top link of each bus remains enabled and the other links are disabled in this mode.

In conjunction with commencing a memory access, the control buffer 468 outputs control packets 412 in parallel over the four links. In this case, the serializer circuit 424 serializes the control packets 412 onto a single link corresponding to CA0. The bit-wise link enable circuit 422 then sends the control packets 412 in series over the enabled CA0 link of the control bus 406. The control packets 412 are received by the bit-wise link enable circuit 438 on CA0 and forwarded to the deserializer circuit 440. The deserializer circuit 440, in turn, sends the control packets 412 in parallel to the control decoding circuit 436 via the four links as shown. The control decoding circuit 436 processes the received control information to determine what action is to be taken by the memory device 404 as discussed above for the high bandwidth mode.

Assuming that the control packets 412 comprise a read command, the memory array 446 outputs write data (hereafter referred to as the data packets 116) to be sent to the memory controller device 402. The serializer/deserializer circuit 444 receives the data packets 416 in parallel via the four links and serializes these data packets onto a single link (corresponding to DQ0). The bit-wise link enable circuit 442 sends the data packets 416 in series over the enabled DQ0 link of the data bus 408. The data packets 416 are received by the bit-wise link enable circuit 426 and forwarded to the serializer/deserializer circuit 428. The serializer/deserializer circuit 428, in turn, routes the data packets 416 in parallel to the data buffer 430 via the four links as shown.

Note that above description of FIGS. 4A and 4B involves an implementation in which the data bus 408 is bidirectional and internal buses carrying the packets 414 and 416 in the memory controller device 402 and the memory device 404 are also bidirectional. In other embodiments, the data bus 408 is bidirectional, but the internal buses carrying the packets 414 and 416 in the memory controller device 402 and the memory device 404 are unidirectional. That is, there is one bus for read data (traveling from the memory device 404 to memory controller device 402) and there is one bus for write data (traveling from memory controller device 402 to memory device 404). This reduces the turnaround penalty when switching between read transactions and write transactions, but will otherwise operate in a manner similar to the above description.

Depending on the selected calibration scheme, calibration is performed for the disabled links from time to time during the low bandwidth mode. For example, as discussed in more detail below in conjunction with FIG. 5, some embodiments employ enabled link based calibration (cal.) 456 for the disabled control links and enabled link based calibration 458 for the disabled data links. In this case, calibration information generated for an enabled link is used to calibrate a disabled link. As discussed in more detail below in conjunction with FIG. 7, some embodiments employ periodic enablement based calibration 460 for the disabled control links and periodic enablement based calibration 462 for the disabled data links. In this case, a disabled link is temporarily enabled on a periodic or other basis so that a calibration operation is performed on that link. It should again be appreciated that because "live" data is potentially being transmitted concurrently over enabled links, the disabled link may be temporary enabled and calibrated with little to no impact to live data transmissions; "dummy data" used for calibration would in this event be transmitted in parallel with the live data (and potentially even in an opposite direction within the same bus, e.g., the same set of links). As discussed in more detail below in conjunction with FIG. 8, some embodiments employ pre-enable based calibration 464 for the disabled control links and pre-enable based calibration 466 for the disabled data links. In this case, a disabled link is enabled just prior to a switch to a higher bandwidth mode so that the link is calibrated and ready for use when the switch occurs.

Calibration Examples

Referring to FIGS. 5-8, disabled link calibration schemes mentioned above will now be treated in more detail. For purposes of explanation, these schemes are described below as being implemented at a memory controller device. It should be appreciated, however, that in other embodiments these schemes are implemented at a memory device or some other device.

Figure 5:
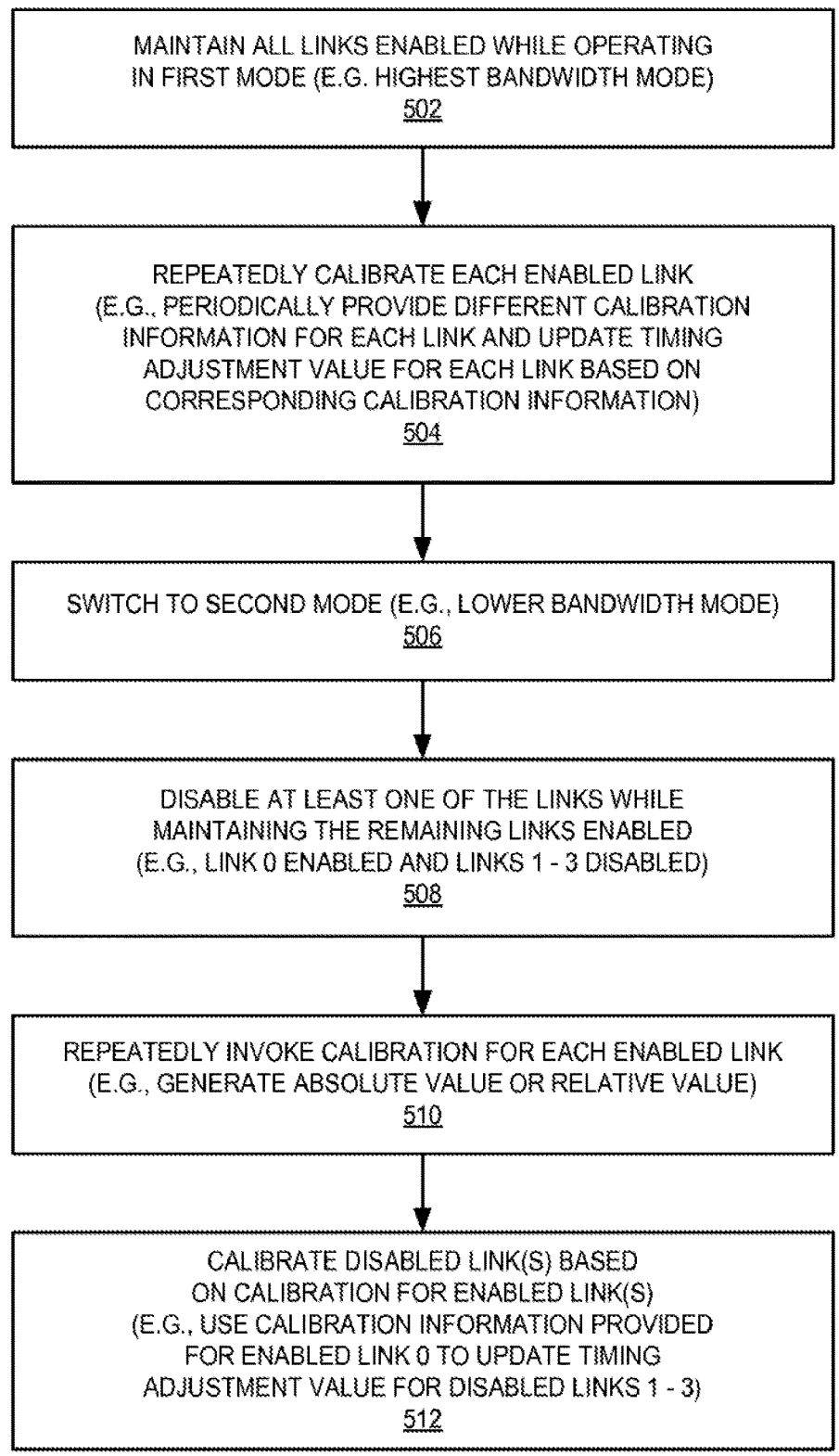
FIG. 5 is a flowchart of an embodiment of operations performed in conjunction with calibrating a disabled link based on calibration information provided for an enabled link.
Figure 6:
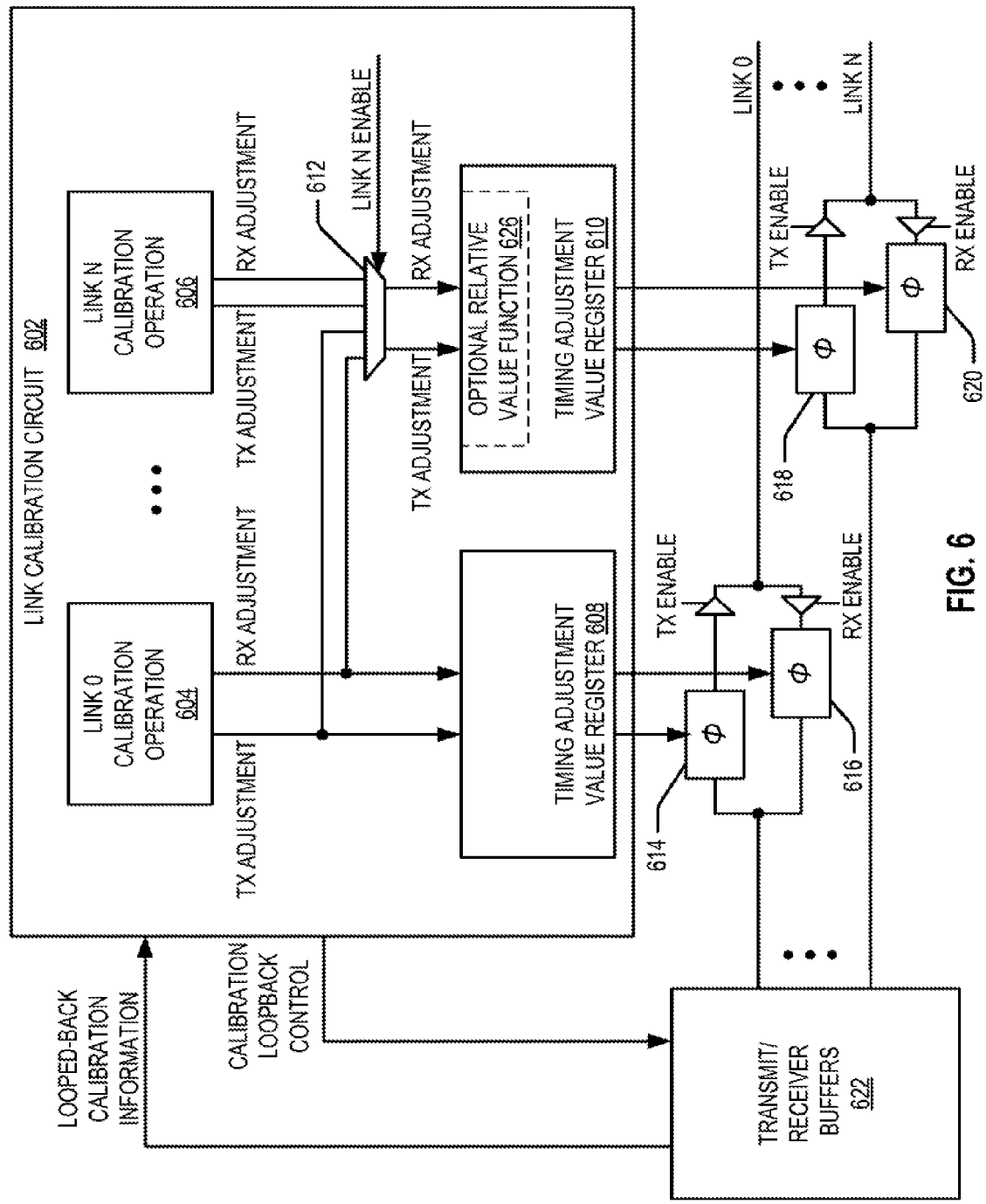
FIG. 6 is a simplified block diagram of an embodiment of circuitry for calibrating a disabled link based on calibration information provided for an enabled link.

FIGS. 5 and 6 relate to a calibration scheme that calibrates a disabled link based on calibration information that was generated for an enabled link. In this example, different links are enabled in different modes of operation (e.g., different bandwidth modes). Thus, upon switching to a given mode of operation, the calibration scheme is employed to calibrate any disabled links in that mode (e.g., by updating timing adjustment information for each disabled link). Blocks 502 and 504 of FIG. 5 describe calibration operations that are performed for enabled links (e.g., according to conventional practice).

As represented by block 502, all of the control and data links are enabled when the memory controller device is operating in a first mode of operation (e.g., the highest bandwidth mode).

As represented by block 504, in implementations where the links are operated at a high signaling rate (e.g., above 1 Gbit/sec), it is necessary in some cases to repeatedly calibrate each link to compensate for temperature drift or any other conditions that affect signal timing on the link. For example, in some implementations a calibration operation is performed on each link on a periodic basis (e.g., every 100 milliseconds) to ensure that certain timing requirements are met. In some implementations, the calibration operation for each link consists of sending calibration data (e.g., a calibration pattern) to a memory device via the link whereupon the memory device loops back the calibration data. The phase of the looped-back data is then compared with the phase of the transmitted data. Based on this comparison, calibration information is provided for adjusting a transmit phase offset (e.g., a timing adjustment value) that is applied to data that is transmitted on the link and for adjusting a receive phase offset (e.g., a timing adjustment value) that is applied to data that is received on the link.

Different types of calibration operations provide different types of calibration information. In some cases, a full calibration operation (i.e., a longer operation) generates a new value from scratch (e.g., an absolute value) that specifies the value to be used to adjust the timing on a link. In some cases, a shorter calibration operation is performed (e.g., at designated intervals in between full calibration operations) to estimate the drift in calibration. This drift estimate is then used to update the current timing adjustment value (e.g., by incrementing or decrementing the current value).

As represented by block 506, at some point in time the memory controller device switches to a second mode of operation (e.g., a lower bandwidth mode). Consequently, as represented by block 508, at least one of the links will be disabled while one or more other links are enabled.

As represented by block 510, in implementations where the enabled links are being regularly calibrated, it is also desirable to regularly calibrate any disabled links. In this way, upon re-enabling the disabled link, the calibration information used to calibrate the disabled link may be sufficiently up-to-date whereby, upon re-enablement, the link is either used immediately without the need for any further calibration or used after a short delay for a relatively minor calibration adjustment. Accordingly, by providing calibration for the disabled link, a latency penalty that would otherwise be incurred upon re-enabling the link is avoided or otherwise mitigated to a considerable degree. The operations of block 510 and 512 are thus invoked for a given link once that link is disabled. Such a calibration scheme is particularly advantageous in an implementation where the links are highly similar (i.e., where the links comprise adjacent, conductive traces that are co-routed).

As represented by block 512, a disabled link is calibrated based on calibration information that is provided for an enabled link. For example, in a case where a data bank comprises four links DQ0-DQ3, DQ0 may be enabled while DQ1-DQ3 are disabled. In this case, a periodic calibration conducted for DQ0 generates new calibration information for every instance of the calibration operation. In this case, each instance of the calibration information generated for DQ0 is used to calibrate DQ1, DQ2, and DQ3. Advantageously, through the use of this calibration scheme, the calibration for a disabled link is kept up-to-date without re-enabling the disabled link.

The sharing of calibration information from an enabled link to a disabled link is accomplished in different ways in different types of calibration schemes. For example, in implementations where the calibration information (e.g., an adjustment value) for each link is stored in a calibration register for that link, the sharing of calibration information involves storing the new value calculated for the enabled link in the calibration register for the enabled link and in the calibration register for the disabled link in some cases.

In some calibration schemes, the sharing of calibration is done on an absolute basis. That is, the calibration value (e.g., timing adjustment value) for the enabled link is used directly by a disabled link. Thus, the absolute calibration value used for the enabled link is also used for the disabled link in this case. In some calibration schemes, the sharing of calibration is done on a relative basis. In this case, the difference in the calibration value for the enabled link (relative to a baseline value for the enabled link) is added to the baseline value of the disabled link. Thus, a relative value that is based on the absolute calibration value used for the enabled link is used for the disabled link in this case. Typically, the baseline values for the enabled and disable links are established at the point the system transitions from one mode (e.g., a high bandwidth mode) to another mode (e.g., a low bandwidth mode); i.e., the last point at which the disabled link was operating normally (i.e., when the link was enabled).

FIG. 6 illustrates a simplified example of a link calibration circuit 602 employed for calibrating a disabled link using the calibration scheme of FIG. 5. The link calibration circuit 602 is implemented in a state machine, in a processor (e.g., that executes a software routine or other suitable routine), in some combination of these, or in some other manner.

At various points in time, the link calibration circuit 602 invokes link calibration operations for the different links in the system. Two instances of these operations for links 0 and N are represented in FIG. 6 by the link 0 calibration operation 604 and the link N calibration operation 606, respectively. To reduce the complexity of FIG. 6, the sharing of calibration information is only depicted from link 0 to link N. It should be understood, however, that similar mechanisms as those described would be employed to share calibration information from link 0 to other disabled links.

As discussed herein, a given instance of the link calibration operation invokes calibration loopback control that causes a calibration pattern (e.g., that was loaded into a transmit/receive buffer 622) to be transmitted on a link. This instance of the link calibration operation generates calibration information (e.g., a phase adjustment value) based on the looped-based calibration information received on the link at the transmit/receive buffer 622.

For the case where both the link 0 and the link N are enabled, calibration information (designated as TX adjustment and RX adjustment) is generated for each link by the corresponding instance of the calibration operation and stored in corresponding timing adjustment value registers 608 and 610. In this case, the multiplexer function represented by the multiplexer 612 (e.g., implemented as a logical operation), causes the calibration information generated by the link N calibration operation 606 to be stored in the register 610 as a result of the enabled state of the link N enable signal.

The adjustment values stored in the registers 608 and 610 are provided to phase adjust circuits in the signal paths for the link 0 and the link N. Specifically, a transmit adjustment value for the link 0 is stored in a phase adjust circuit 614 for the transmit path and a receive adjustment value for the link 0 is stored in a phase adjust circuit 616 for the receive path. Similarly, for the link N, a transmit adjustment value is stored in a phase adjust circuit 618 for the transmit path and a receive adjustment value is stored in a phase adjust circuit 620 for the receive path. In this way, signals transmitted and received over the links are phase adjusted by an amount that is based on the corresponding adjustment values.

For the case where the link 0 is enabled and the link N is disabled, calibration information is periodically generated for the link 0 but not for the link N. However, the calibration information for the link 0 is stored in both registers 608 and 610. In this case, the multiplexer function represented by the multiplexer 612 causes the calibration information generated by the link 0 calibration operation 604 to be sent to the register 610 as a result of the disabled state of the link N enable signal. As discussed herein, in some implementations the calibration information generated by the calibration operation 604 is an absolute value while in other implementations this calibration information is a relative value. In the former case, the absolute value is simply stored in the register 610. To support the latter case, the link calibration circuit 602 is depicted as optionally including a relative value function 626 (e.g., comprising arithmetic logic) that adds the received relative value to a baseline value (e.g., stored in the register 610) to provide a final timing adjustment value that is then stored in the register 610 to control the corresponding phase adjust circuit 618 or 620. As the link 0 is periodically calibrated to compensate for temperature drift and/or other conditions, the link N will be periodically calibrated as well. Thus, when the link N is re-enabled, the calibration information stored in the register 610 is sufficiently up-to-date such that the link N commences operation with little or no additional calibration. As a result, the link N commences carrying traffic almost immediately (e.g., within a few clock cycles) after the memory controller device switches to a higher bandwidth mode that uses the link N. Note that a "long" calibration sequence can be performed when all links are enabled, such that relative transmit and receive phases can vary over time link-by-link; in a low bandwidth mode where "short" calibration sequence updates are "copied" from enabled links, such an operation effectively freezes the relative phases of the various links, with "delta" changes causing phase updates in all links in a group to move together.

Figure 7:
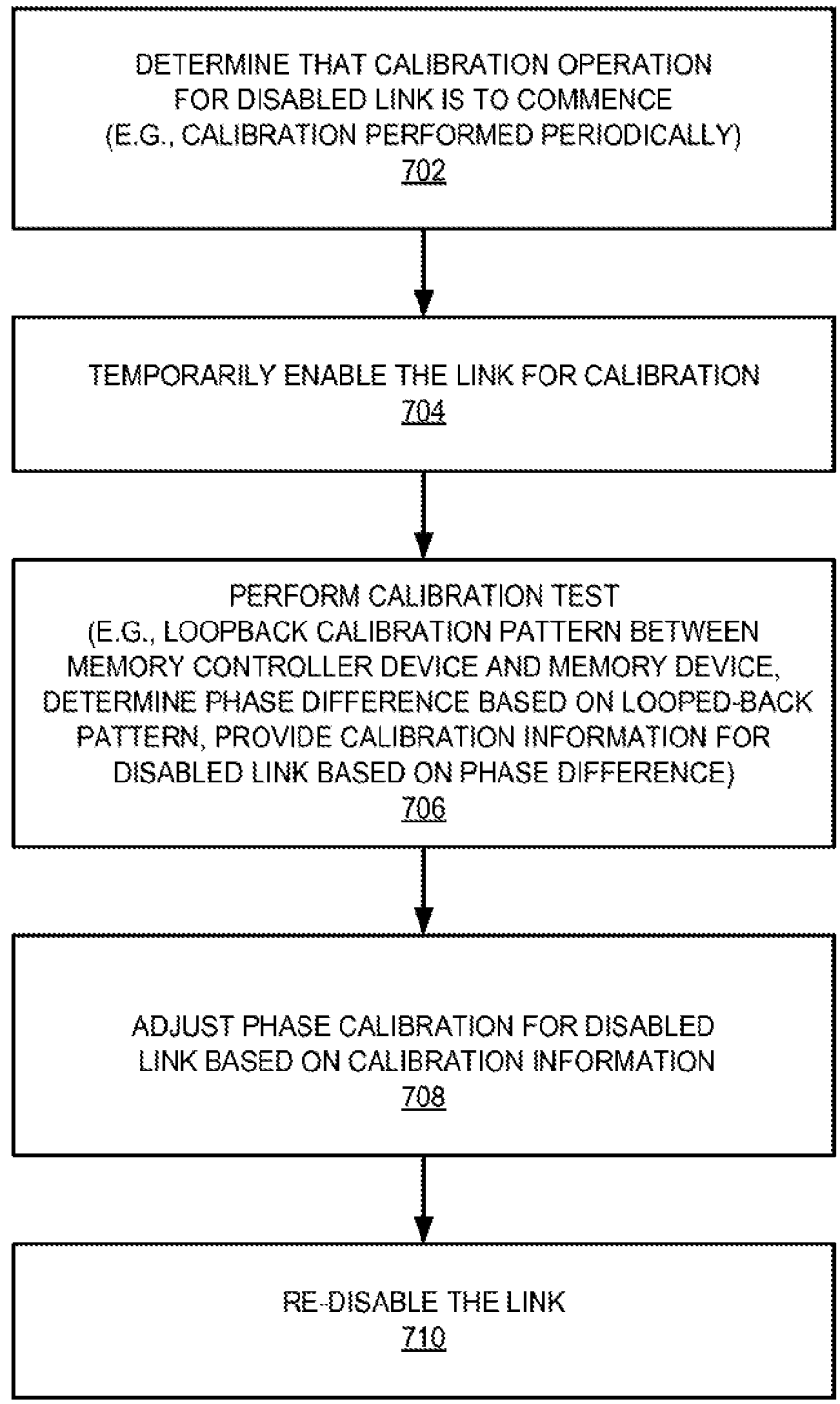
FIG. 7 is a flowchart of an embodiment of operations performed in conjunction with calibrating a disabled link by periodically enabling the link on a temporary basis to perform calibration operations on the link.

FIG. 7 relates to a calibration scheme that involves temporarily enabling a disabled link to calibrate the link. The operations of FIG. 7 are invoked for a given link once that link is disabled.

As represented by block 702, at some point in time, the memory controller device determines that a calibration operation for a disabled link is to be performed. In some implementations, this operation is scheduled to be invoked on a periodic basis.

As represented by block 704, the link is temporarily enabled for the calibration operation. This involves, for example, turning on driver circuits and receiver circuits for the link at the memory controller device. In addition, the memory controller device sends an appropriate indication (e.g., an opcode) to the memory device to inform the memory device that this link needs to be temporarily enabled for a calibration operation. As a result of receiving this indication, the memory device will enable the link from its perspective and configure the link to loopback the calibration pattern, if applicable.

As represented by block 706, a calibration test is performed on the link. This involves, for example, looping back a calibration pattern over the link, determining a phase difference based on the looped-back pattern, and providing calibration information based on the phase difference. As a specific example, a memory controller sends a command to a memory device via a control bus to instruct the memory device to loopback a specified link that is temporarily enabled. The memory controller transmits non-live data (e.g., dummy data such as a calibration pattern) over the temporarily enabled link and receives the looped-back data after a short propagation delay. Based on this propagation delay and/or other characteristics of the received signal, the memory controller determines an appropriate timing adjustment value (e.g., an absolute or incremental value) for the link.

As represented by block 708, the phase calibration for the disabled link is adjusted based on the calibration information generated at block 706. For example, a phase adjustment value is loaded into a calibration register for the link as discussed above.

As represented by block 710, upon completion of the calibration operation, the link is disabled again to reduce the power consumption of memory controller device and the memory device during the low bandwidth mode. In some implementations, the memory controller device informs the memory device that the calibration operation is completed or that the link should be disabled. In other implementations, the memory device autonomously determines when to disable the link from its perspective (e.g., based on a timer and/or after looping back the calibration pattern).

The scenario of FIG. 7 illustrates that in some embodiments a system will calibrate a link (e.g., disabled link N) that is not carrying live data (e.g., actual user data) while another link (e.g., enabled link 0) is transmitting live data. In this case, the disabled link carries dummy data (e.g., non-user data such as a calibration pattern), as previously noted.

Figure 8:
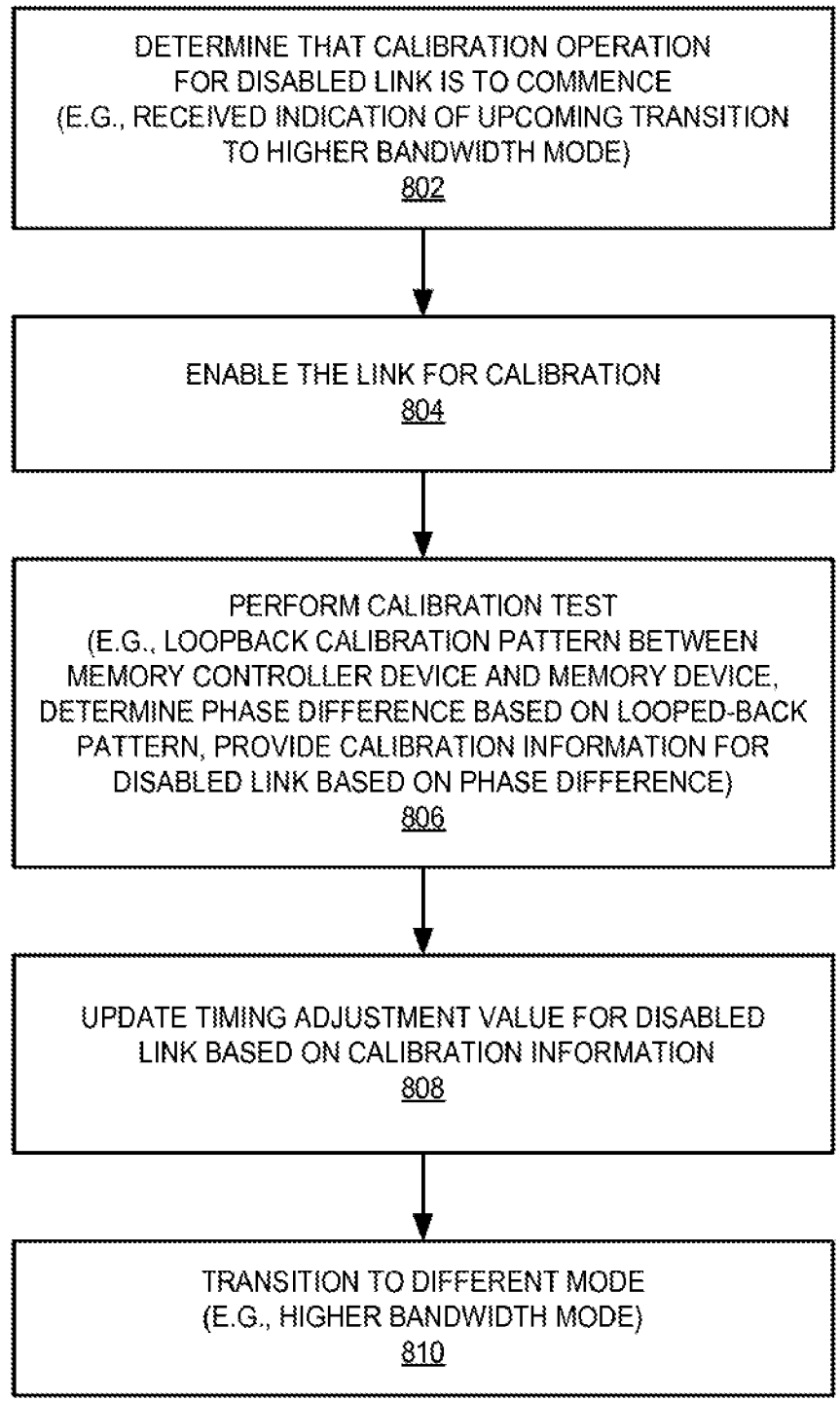
FIG. 8 is a flowchart of an embodiment of operations performed in conjunction with calibrating a disabled link by enabling the link prior to a switch to a different mode of operation.

FIG. 8 describes a calibration scheme where link calibration is performed shortly before a disabled link is re-enabled. The operations of FIG. 8 are invoked for a given link once that link is disabled.

As represented by block 802, at some point in time, the memory controller device determines that a calibration operation for a disabled link is to be performed. In some implementations, the memory controller device receives an indication of an upcoming transition to a higher bandwidth mode that uses the disabled link. This indication takes the form of, for example, a signal that indicates that the system (e.g., an SoC) is transitioning to a higher power mode.

As represented by block 804, the link is temporarily enabled for the calibration operation. This involves, for example, turning on appropriate circuits for the link at the memory controller device and sending an appropriate indication to the memory device as discussed above at block 704.

As represented by block 806, a calibration test is performed on the link. This involves, for example, performing the operations discussed above at block 706.

As represented by block 808, the phase calibration for the disabled link is adjusted based on the calibration information generated at block 806. In some implementations, this involves loading a phase adjustment value into a calibration register for the link.

As represented by block 810, upon completion of the calibration operation, the link is left in an enabled state in anticipation of the upcoming transition to a different mode of operation (e.g., a higher bandwidth mode) by the memory controller device.

Detailed Implementation Examples

Referring now to FIGS. 9-13, additional details relating to bandwidth switching timing and circuitry for link enablement, link calibration, and serialization gearing will be described in the context of a memory system that employs 16 DQ links and 3 CA links.

Figure 9:
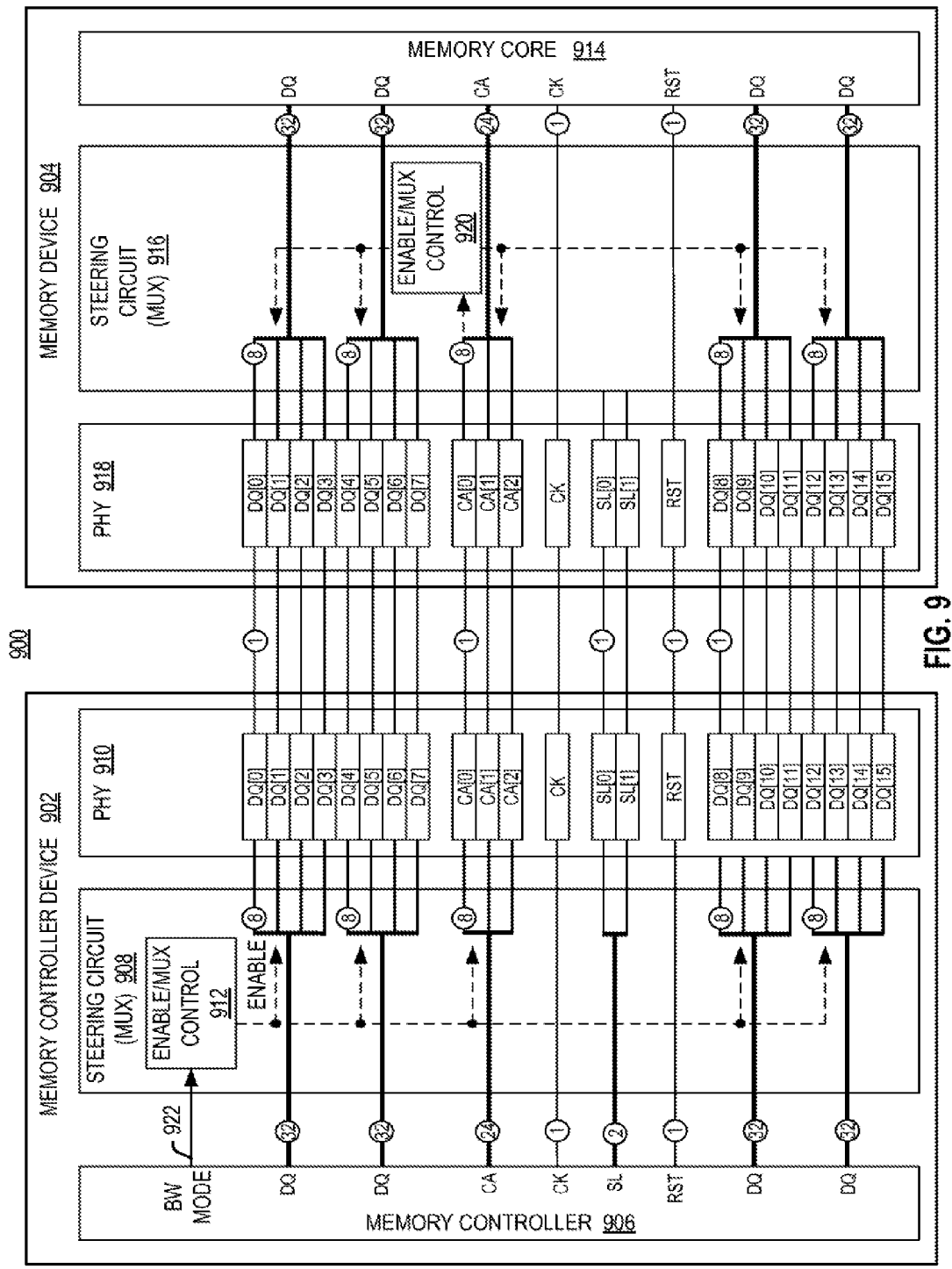
FIG. 9 is a simplified block diagram of an embodiment of a memory system operable to dynamically change memory access bandwidth by disabling and enabling control links and/or data links.

FIG. 9 illustrates a memory system 900 that includes a memory controller device 902 and a memory device 904. A bus interface between the memory controller device 902 and the memory device 904 includes a 3-bit control bus CA[0-2], a 16-bit data bus DQ[0-15], a clock bus (CK), a sideband link bus (SL), and a reset bus (RST). In this embodiment, the internal CA bus is 24 bits wide, resulting in an external CA width of 3 links, using a serialization of 8:1 to match that used by the data links. This embodiment could be modified to provide a second embodiment that uses an internal CA bus that is 32 bits wide, resulting in an external CA width of 4 links, using a serialization of 8:1 to match that used by the data links. This second embodiment would require more CA links, but would provide more CA bandwidth. This could be a good tradeoff in some applications.

The memory controller device 902 includes a memory controller 906, a steering circuit 908, and a physical interface (PHY) 910.

The memory controller 906 provides conventional memory controller functionality such as memory request queuing, memory request arbitration, clock generation, processor-side interface circuitry, and so on. The memory controller 906 also provides functionality relating to dynamic bandwidth switching as taught herein. For example, the memory controller 906 may receive a power mode indication from another component (e.g., an SoC component) and provide a bandwidth mode signal 922 based on the power mode indication. Also, in some implementations, the memory controller 906 performs calibration-related operations (e.g., initiating and performing a link calibration test and outputting calibration adjustment information). As another example, the memory controller 906 provides bandwidth mode indications for the memory device 904 (e.g., by generating opcodes and inserting the opcodes onto the CA[0] link).

The steering circuit 908 couples the data (DQ), command and address (CA), and other ports of the memory controller 906 to the physical interface 910. In some aspects, the steering circuit 908 comprises multiplexer (MUX) functionality for selectively routing signals to/from different paths. Accordingly, the steering circuit 908 provides functionality relating to dynamic bandwidth switching such as the serializer and deserializer functionality discussed herein.

FIG. 9 illustrates an implementation where the steering circuit 908 includes an enable/multiplexer control component 912 that generates control signals (represented in a simplified manner by the dashed lines) to enable the serialization gearing and link enable circuitry. For example, the enable/multiplexer control component 912 generates control signals similar to those described in FIG. 4 based on the bandwidth mode signal 922. In other implementations, some or all of this functionality is implemented in some other component (e.g., the memory controller 906 and/or the physical interface 910).

The physical interface 910 includes circuitry (e.g., driver circuits, receiver circuits, buffers, and connectors) to drive signals onto the CA, DQ and other busses and/or to receive signals via these busses. The physical interface 910 also provides functionality relating to dynamic bandwidth switching as taught herein. For example, the physical interface 910 is configured so that each link of the CA and DQ busses is individually controllable (e.g., each driver circuit and receiver circuit is independently enabled and disabled). In a typical implementation, the physical interface 910 includes calibration circuits (e.g., phase adjust circuits) for each link. Also, some of the serializer and deserializer functionality described herein is implemented in the physical interface 910 in some implementations.

The memory device 904 includes a memory core 914, a steering circuit 916, and a physical interface (PHY) 918. The memory core comprises one or more memory arrays. These arrays are co-located on one integrated circuit in some embodiments and located on different integrated circuits (e.g., for an implementation where the memory device 904 is a memory module) in other embodiments.

The steering circuit 916 couples the data (DQ), command and address (CA), and other ports of the memory core 914 to the physical interface 918. In general, the steering circuit 916 performs signal routing, serialization, deserialization, multiplexing and other operations similar to the steering circuit 908. The steering circuit 908 is also depicted as including an enable/multiplexer control component 920 that generates control signals (represented in a simplified manner by the dashed lines) to enable the serialization gearing and link enable circuitry at the memory device 904. In this case, however, control signals are generated based on an indication (e.g., an opcode) received from the memory controller device 902 via the CA[0] link.

The steering circuit 916 also includes loopback circuitry (not shown) for looping back various types of information. For example, loopback circuitry is provided for each link to selectively loopback calibration data for calibration operations in some implementations.

In general, the physical interface 918 includes circuitry similar to the physical interface 910 for driving and receiving signals on the CA, DQ and other busses. In addition, the physical interface 918 provides link enable functionality and other functionality relating to dynamic bandwidth switching as discussed above. In the embodiment of FIG. 9, most or all of the calibration circuitry is located in the PHY block 910 of the memory controller device 902, with little or no calibration circuitry located in the PHY block 918 of the memory device 904. In other embodiments, more of the calibration circuitry is placed in the PHY block 918 of the memory device 904.

In some implementations, the sideband links (SL) are used to support dynamic bandwidth operations. In this case, the memory controller 902 sends the bandwidth mode indication over these links instead of CA[0]. Also, in some implementations, these links are used to signal transitions between calibrated and uncalibrated operating modes on the CA, DQ, and CK links.

The memory system 900 is configurable to operate at different signaling rates. By controlling clock rates and through the use of appropriate signal path calibration and parallel termination for the links, the physical interfaces 910 and 918 selectively support signaling rates of, for example, 800 Mbits/second, 1600 Mbits/second, 3200 Mbits/second, or even higher signaling rates. For a given signaling rate, however, the frequency of the clock signal on the clock bus (CK) is not changed when there is a switch between bandwidth modes. The dynamic bandwidth scheme taught herein may be employed in such a system to provide high bandwidth memory accesses at any of these signaling rates when needed, and provide reduced power consumption by disabling one or more links when lower memory access bandwidth will suffice. As used herein, a parallel terminated link refers to a link that has a termination element (e.g., a resistor) placed in parallel with a load that is, in turn, coupled between the link and another link or reference (e.g., ground). Thus, parallel termination differs from series termination where the termination element is in series with the link. Typically, a parallel termination element is placed near the end of a link (e.g., at, near, or within a receiver connected to an endpoint of the link).

In one implementation, the DQ links are grouped in sets of four (e.g., DQ[0:3], DQ[4:7], DQ[8:11], and DQ[12:15]), whereby one link is each group remains enabled in the low bandwidth mode. For example, during a low bandwidth mode CA[0], DQ[0], DQ[4], DQ[8], and DQ[12] are enabled while the rest of the CA and DQ links are disabled. As discussed above, a given one of CA[0], DQ[0], DQ[4], DQ[8], and DQ[12] will operate at a common (i.e., the same) signaling rate for the low and high bandwidth modes. This implementation is an example of a situation where links need not be individually controlled. For example, in some implementations three links in each set (e.g., DQ[1:3] are controlled as a group such that these three links are either all enabled or all disabled at the same time, while the other link (e.g., DQ[0]) remains enabled at all times. This is accomplished, for example, through the use of fixed wiring that permits only these two states for this set of links.

It should be appreciated that other bandwidth modes may be provided for the system 900. For example, half of the DQ links and two of the CA links remain enabled during a half bandwidth mode. In addition, ¾ of the DQ links and two of the CA links remain enabled during a ¾ bandwidth mode.

The CA and DQ links of FIG. 9 may be disabled in various ways. For example, in some embodiments the clocks for serializer and deserializer circuits in the physical interfaces 910 and 918 are disabled or frozen. In addition, or alternatively, DC power for the receivers (e.g., receiver circuits), transmitters (e.g., driver circuits), and parallel terminations in the physical interfaces 910 and 918 is disabled (e.g., cutoff) in some embodiments.

The power savings achieved through the use of a link disabling scheme as taught herein are comparable to the power savings achieved by a scheme that simply reduces the signaling rate on the links. For example, a scheme that reduces the signaling rate by ¼ reduces the AC power of the global clock distribution by ¼ and reduces the AC power of serializer and deserializer circuits by ¼. However, the DC power for termination, transmitters, and receivers is unchanged in the rate reduction scheme. In contrast, a scheme that disables ¼ of the links as taught herein reduces the DC power for termination, transmitters, and receivers by ¼ and reduces the AC power of serializer and deserializer circuits by ¼. However, the AC power of the global clock distribution is unchanged in the link disabling scheme.

Figure 10:
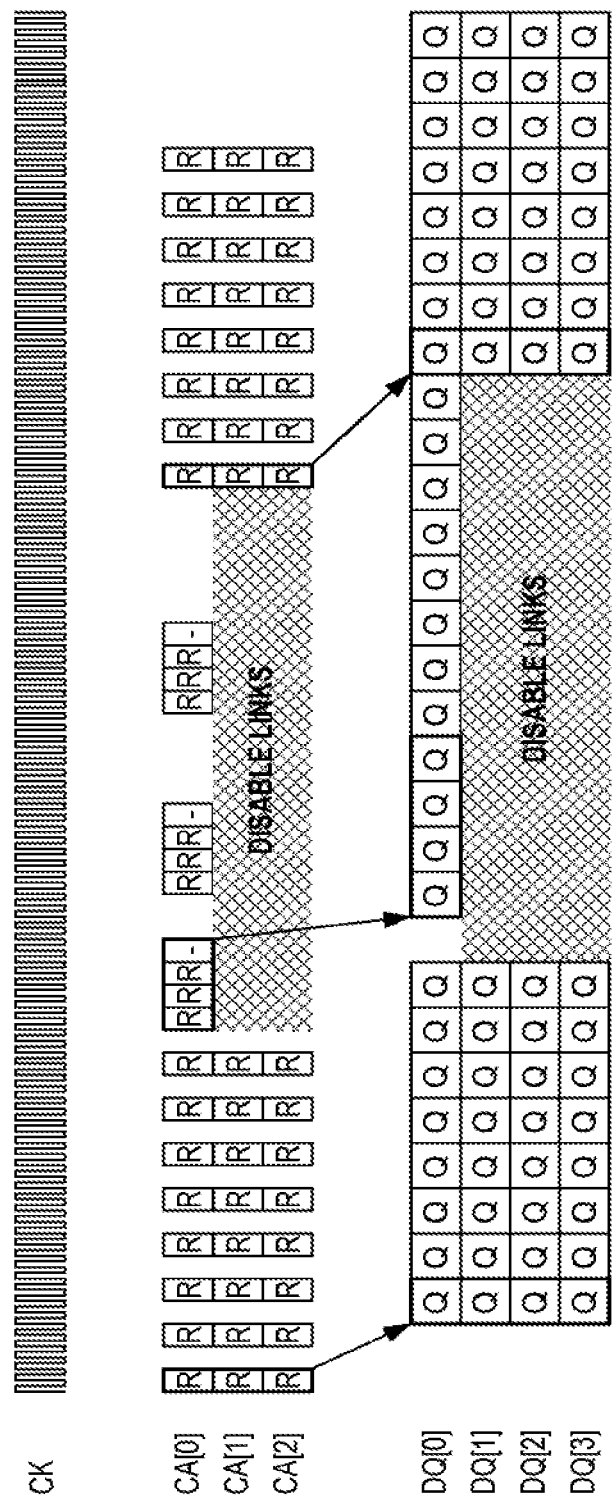
FIG. 10 is a simplified diagram illustrating an example of switching between a high bandwidth mode and a low bandwidth mode on a control channel and a data channel.

FIG. 10 illustrates, in a simplified manner, how the dynamic bandwidth scheme is employed for the CA links and one set of the DQ links of the system 900. Although DQ[4:7], DQ[8:11], and DQ[12:15] are not depicted in FIG. 10, these links will operate in a similar manner as DQ[0:3]. The high bandwidth mode is employed for the first 8 memory access operations (e.g., read operations). Thus, CA[0:2] are used to carry control traffic and DQ[0:3] are used to carry data traffic. The low bandwidth mode is employed for the next 3 memory access operations. CA[1:2] and DQ[1:3] are disabled, leaving only CA[0] to carry control traffic and DQ[0] to carry data traffic. In this case, the control traffic is sent in series on CA[0] and the data traffic is sent in series on DQ[0]. The high bandwidth mode is then re-employed as above. With the high-level overview of FIG. 10 in mind, additional details of this information flow will be described at FIGS. 11 and 12.

Figure 11:
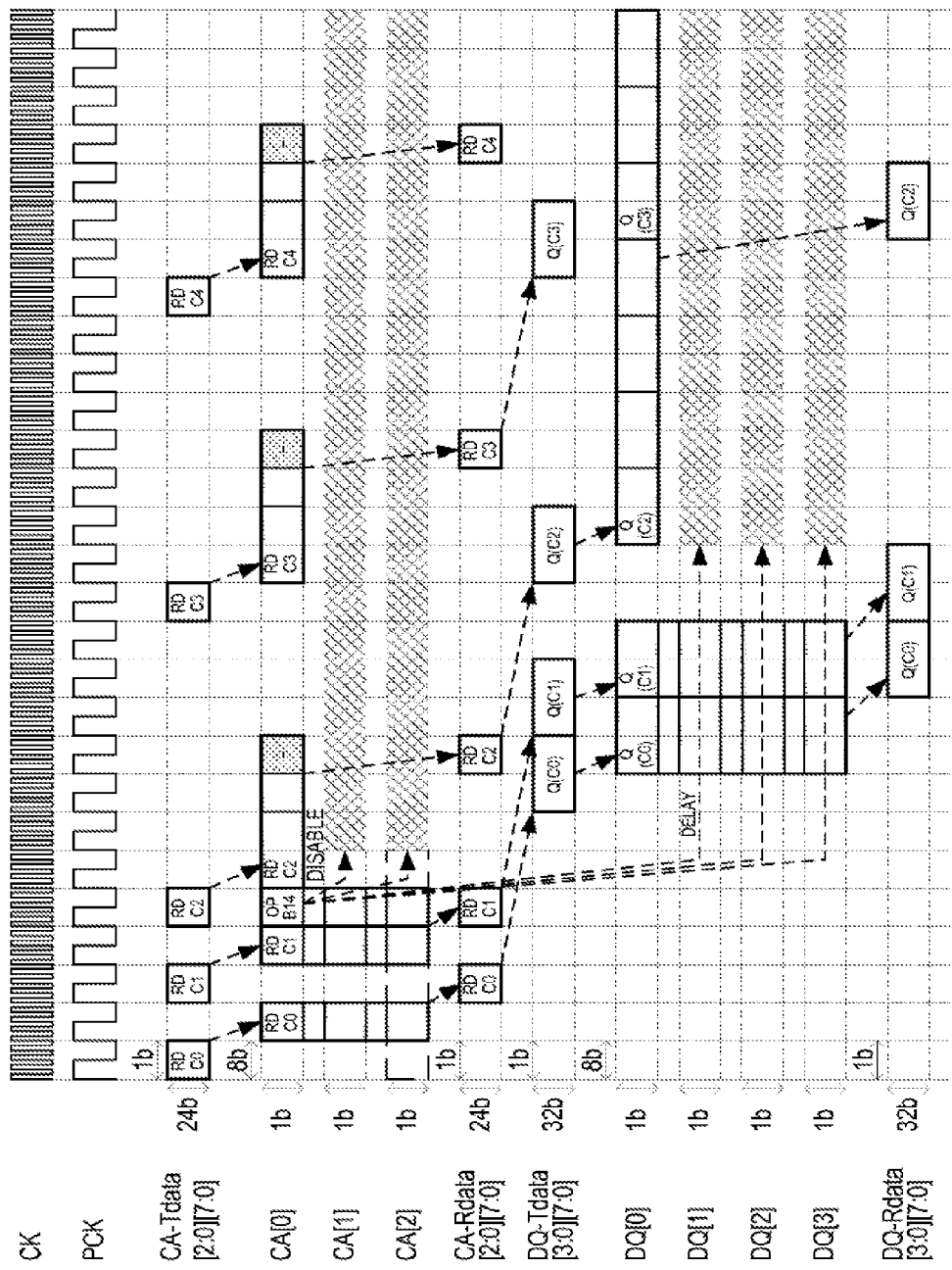
FIG. 11 is a simplified timing diagram illustrating an example of switching from a high bandwidth mode to a low bandwidth mode on a control channel and a data channel.

FIG. 11 illustrates timing and information flow for the transition from the high bandwidth mode to the low bandwidth mode. Initially, the read operation for C0 during the high bandwidth mode is described in detail. CA-Tdata represents the 24 bits of CA information output by the memory controller 906. This CA information is clocked out on CA[0:2]. CA-Rdata represents the 24 bits of CA information received by the memory core 914 at its CA ports. Since the command for C0 was a read command, the memory core outputs 32 bits of read data Q(C0) on DQ-Tdata. This read data is clocked out on Q[0:3]and received at the DQ ports of the memory controller 906 as represented by DQ-Rdata.

Following the read command for C1, a transition to the low bandwidth mode is commenced. The memory controller device 902 inserts an opcode OP B14 onto the CA[0]link. After a delay period (one PCK cycle in this case), CA[1:2] are disabled. The DQ[1:3]links are not disabled, however, until the data for the C0 and C1 commands is received at the memory controller 906.

The subsequent read command for C2 is conducted during the low bandwidth mode. Thus, memory controller device 902 serializes the RD C2 control information and sends it in series over CA[0]. In addition, the memory device 904 serializes the corresponding read data Q(C2), and sends it in series over DQ[0]. In other words, in the high bandwidth mode each 24-bit command is serialized in eight successive transmission slots on each of three CA links. In the low bandwidth mode each 24-bit command is serialized in 24 successive transmission slots on one CA link.

Advantageously, there is only a small delay associated with the transition of the data bus from the high bandwidth mode to the low bandwidth mode since DQ[0] was already enabled and maintained the same signaling rate. Specifically, the serial data transfer for the Q(C2) is commenced three PCK cycles after the parallel data transfer for Q(C1) is completed. Thus, for an implementation where PCK is 400 MHz, the latency associated with this bandwidth mode switch is on the order of 2.5 nanoseconds, i.e., the time needed to transmit the opcode "OP B14" which instructs the interfaces to transition from the high bandwidth mode to the low bandwidth mode. This time could be reduced to zero if there were unused command fields in each command or if a sideband signal was available to signal the transition.

Figure 12:
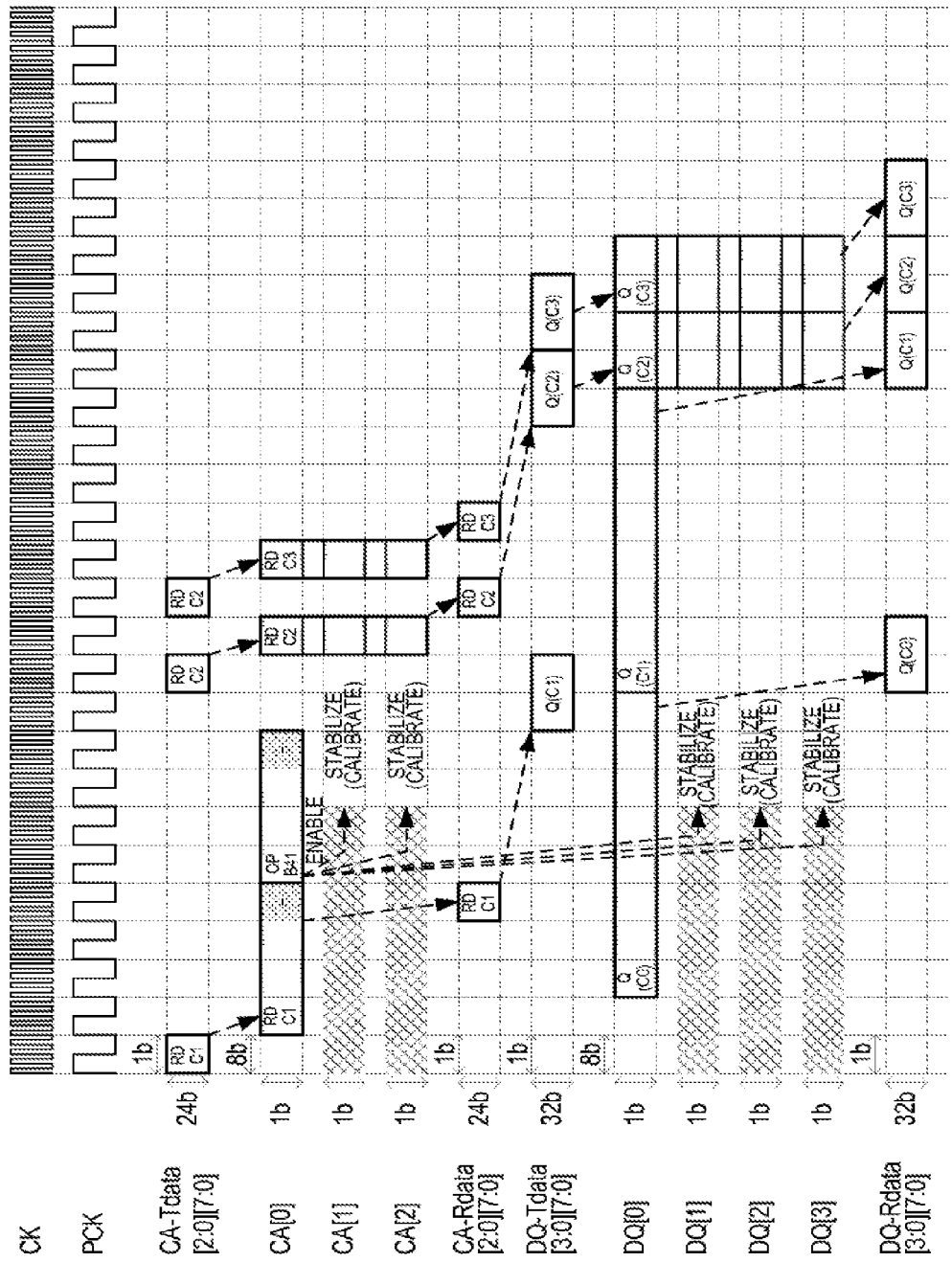
FIG. 12 is a simplified timing diagram illustrating an example of switching from a low bandwidth mode to a high bandwidth mode on a control channel and a data channel.

FIG. 12 illustrates timing and information flow for a transition from the low bandwidth mode to the high bandwidth mode. The read operation for C1 occurs during the low bandwidth mode as described in FIG. 11.

After the read command for C1 is sent over CA[0], a transition to the high bandwidth mode is commenced. The memory controller device 902 inserts an opcode OP B41 onto the CA[0]link. The CA[1:2]and DQ[1:3]links are thus re-enabled after the next PCK cycle. A brief period of time is then allowed for stabilization of the re-enabled links and, if applicable, calibration of the links.

The subsequent read command for C2 is conducted during the high bandwidth mode. Thus, the memory controller device 902 outputs the RD C2 control information in parallel over CA[0:2]. In addition, the memory device 904 outputs the corresponding read data Q(C2), in parallel over DQ[0:3].

Again, there is only a small delay associated with the transition from the low bandwidth mode to the high bandwidth mode. Specifically, the read command RD C2 is sent three PCK cycles after the opcode OP B41 transfer is completed, i.e. the time needed to transmit the opcode "OP B41" which instructs the interfaces to transition from the high bandwidth mode to the low bandwidth mode. This time could be reduced to zero if there were unused command fields in each command or if a sideband signal was available to signal the transition. The time could be further reduced if no stabilization or calibration operations were needed by the disabled links to become re-enabled. Moreover, the parallel data transfer for Q(C2) is commenced immediately after the (relatively) serial data transfer for Q(C1) is completed.

FIGS. 11 and 12 illustrate that a device implemented according to the teachings herein can rapidly switch between different bandwidth modes due to the elimination of operations relating to changing signaling rates and performing calibration at the time of the mode switch. For example, a mode switch is accomplished without waiting for a settling time that would otherwise be associated with a change in signaling rate. In addition, calibration operations such as looping back calibration information, calculating timing information, updating timing registers, waiting for the timing adjustment to settle, and so on are performed prior to the mode switch. Thus, a mode switch can be achieved as quickly as the time it takes for the mode switch command to be sent to another device in cases where the disabled links are sufficiently calibrated and stable at the time of the mode switch.

Figure 13:
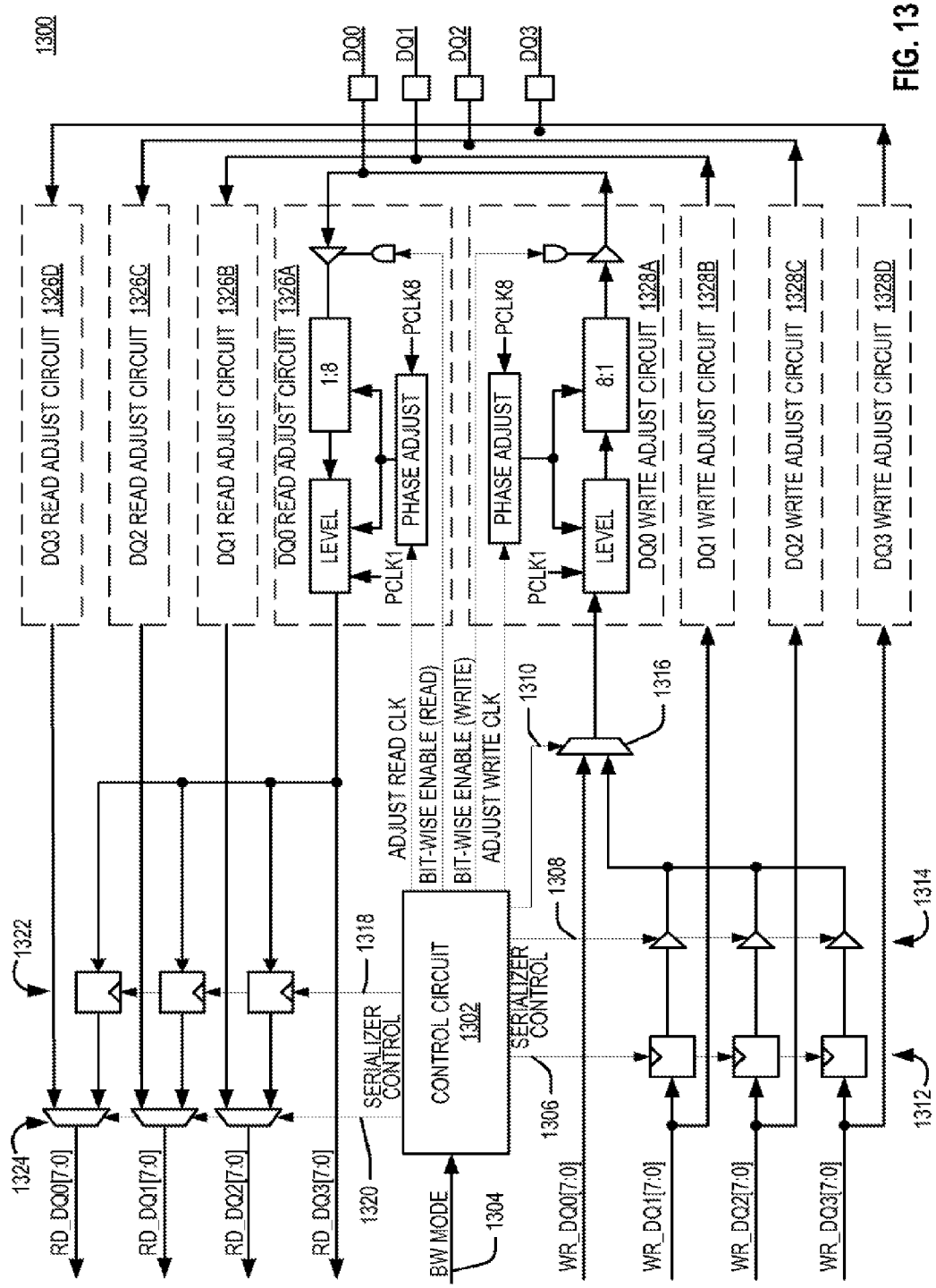
FIG. 13 is a simplified block diagram of an embodiment of circuitry for providing bit-wise enabling/disabling of links, serialization gearing on conjunction with the enabling/disabling of the links, and phase calibration for enabled and disabled links.

FIG. 13 illustrates a more detailed example of a circuit 1300 that provides the link enable, serialization, deserialization, and calibration functionality used to dynamically change memory access bandwidth as described herein. This example illustrates a read path (top half of FIG. 13) and a write path (bottom half) for DQ[0:3]. This circuitry is employed at the memory controller device or the memory device. It should be appreciated that the circuitry disclosed herein is employed for the control path as well in some embodiments. For example, the write path may be employed at the memory controller device for sending CA information over CA[0:2]. In this case, any illustrated circuitry that would otherwise correspond to CA[3] may be reserved for some other use or not used. In addition, the read path of FIG. 13 may be employed at the memory device for receiving CA information via CA[0:2]. In practice, it is not necessary to have phase adjust circuitry on both the transmitter side of a link and the receiver side of the link. Rather, it is generally sufficient to adjust one end or the other. Typically, the end of the link at the memory controller device will have phase adjust circuitry for both directions of bidirectional transfer between devices. However, other link elements are calibrated at both ends of a link in some cases. For example, termination elements located on each side of a link are typically calibrated.

A control circuit 1302 generates control signals based on a received bandwidth mode indication 1304 to control serialization gearing for transitions between bandwidth modes. For example, serialization gearing for the write path is controlled by serializer control signals 1306, 1308, and 1310 that control latches 1312, tri-state drivers 1314, and a multiplexer 1316, respectively. Serialization gearing for the read path is controlled by serializer control signals 1318 and 1320 that control latches 1322 and multiplexers 1324, respectively. Thus, the serialization gearing control aspect of FIG. 13 corresponds to the control circuits and the serializer-related circuits of FIG. 4.

The control circuit 1302 also generates bit-wise enable signals based on the received bandwidth mode indication 1304 to control which DQ links are enabled for the different bandwidth modes. For example, FIG. 13 illustrates a bit-wise enable (read) signal that controls a receiver (e.g., comprising a receiver circuit and parallel termination) in the DQ0 read adjust circuit 1326A. In addition, a bit-wise enable (write) signal controls a transmitter (e.g., comprising a driver circuit and series termination) in the DQ0 write adjust circuit 1328A. Thus, the bit-wise link enable control aspect of FIG. 13 corresponds to the control circuits and the bit-wise link enable circuits of FIG. 4.

The control circuit 1302 also generates calibration signals (e.g., timing adjustment values) to control the phase offset applied to signals transmitted and received via the DQ links. For example, based on each calibration operation performed on the link DQ0, a new adjust read clk signal is output to a phase adjust circuit in the DQ0 read adjust circuit 1326A. This adjust read clk signal causes the phase adjust circuit to, for example, increment or decrement the phase offset that is applied to a received DQ0 signal by the 1:8 deserializer and the level circuit in the read (receive) DQ0 signal path. Similarly, based on each calibration operation performed on the link DQ0, a new adjust write clk signal is output to a phase adjust circuit in the DQ0 write adjust circuit 1328A. This adjust write clk signal causes this phase adjust circuit to, for example, increment or decrement the phase offset that is applied to a transmitted DQ0 signal by the level circuit and the 8:1 serializer in the write (transmit) DQ0 signal path.

To reduce the complexity of FIG. 13, the circuits for the other adjust circuits 1326B-D and 1328B-D are not shown. For similar reasons, the bit-wise enable signals and the adjust signals for the adjust circuits 1326B-D and 1328B-D are not shown in FIG. 13. The circuits for the adjust circuits 1326B-D and 1328B-D are similar to the circuitry for the adjust circuits 1326A and 1328A, respectively, as are the use of the bit-wise enable and adjust signals.

Combination Examples

Figure 14:
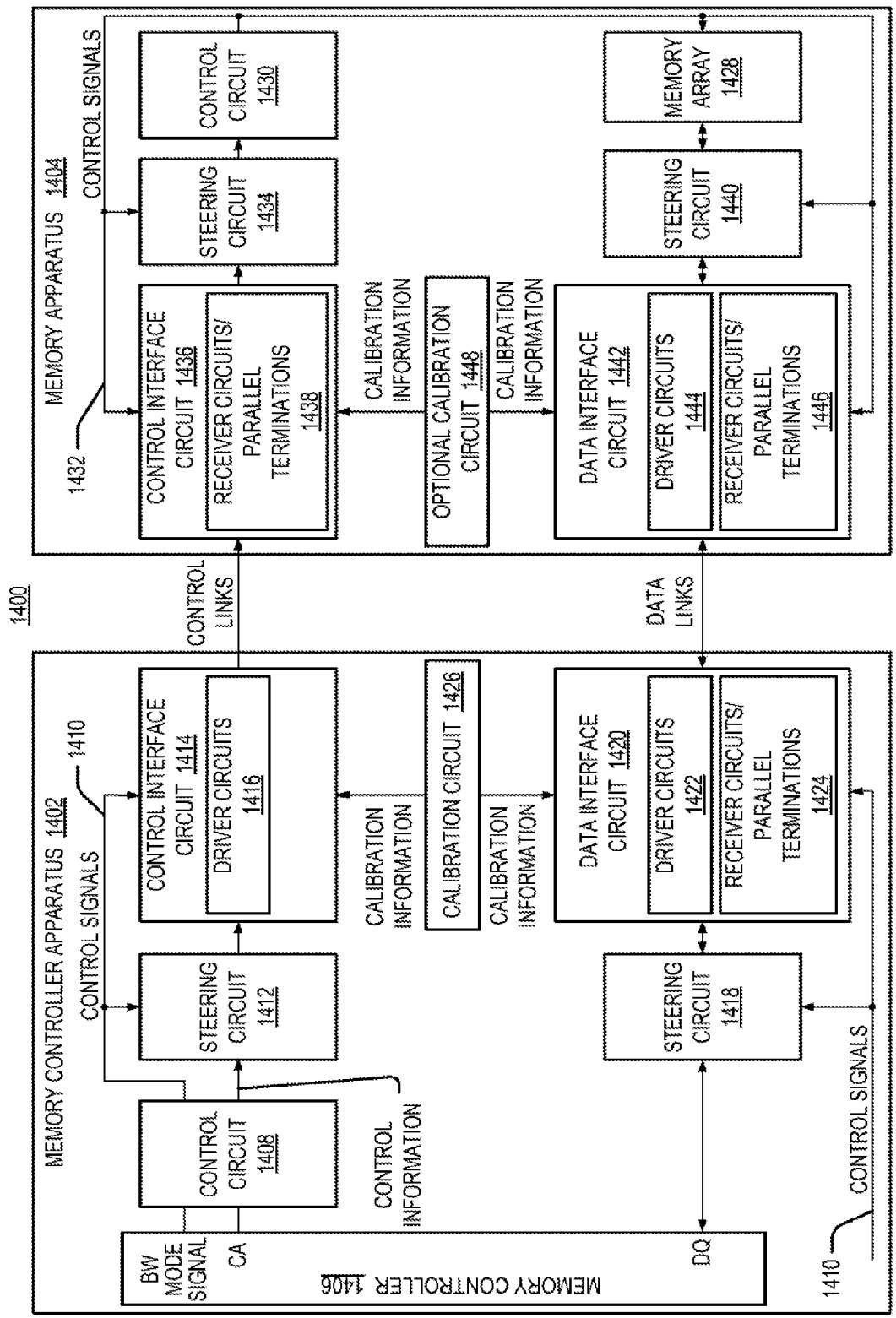
FIG. 14 is a simplified block diagram illustrating embodiments of apparatuses operable to dynamically change memory access bandwidth by disabling and enabling control links and/or data links.
Figure 15:
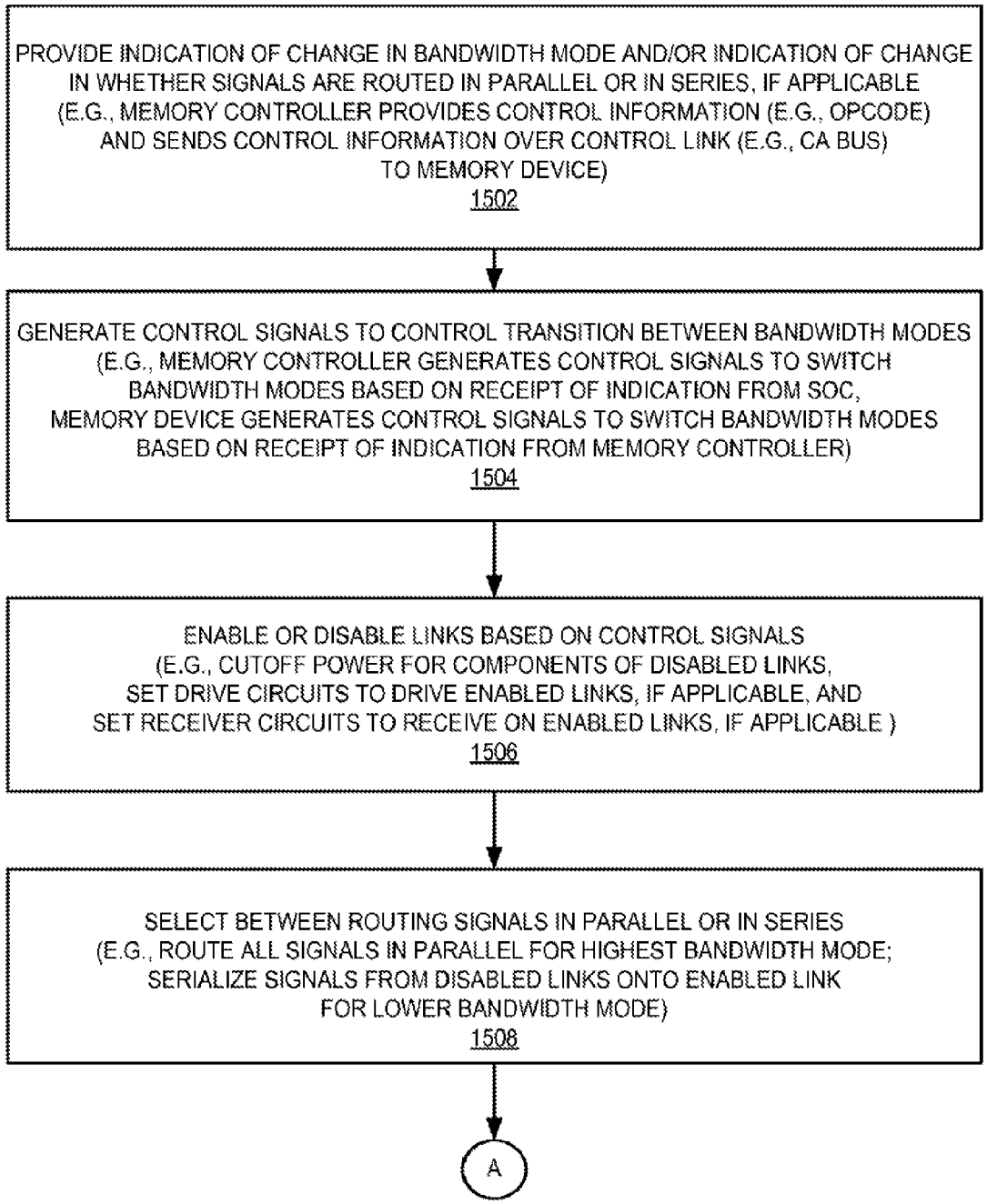
FIGS. 15 and 16 are a flowchart illustrating examples of operations performed in conjunction with dynamically changing memory access bandwidth.
Figure 16:
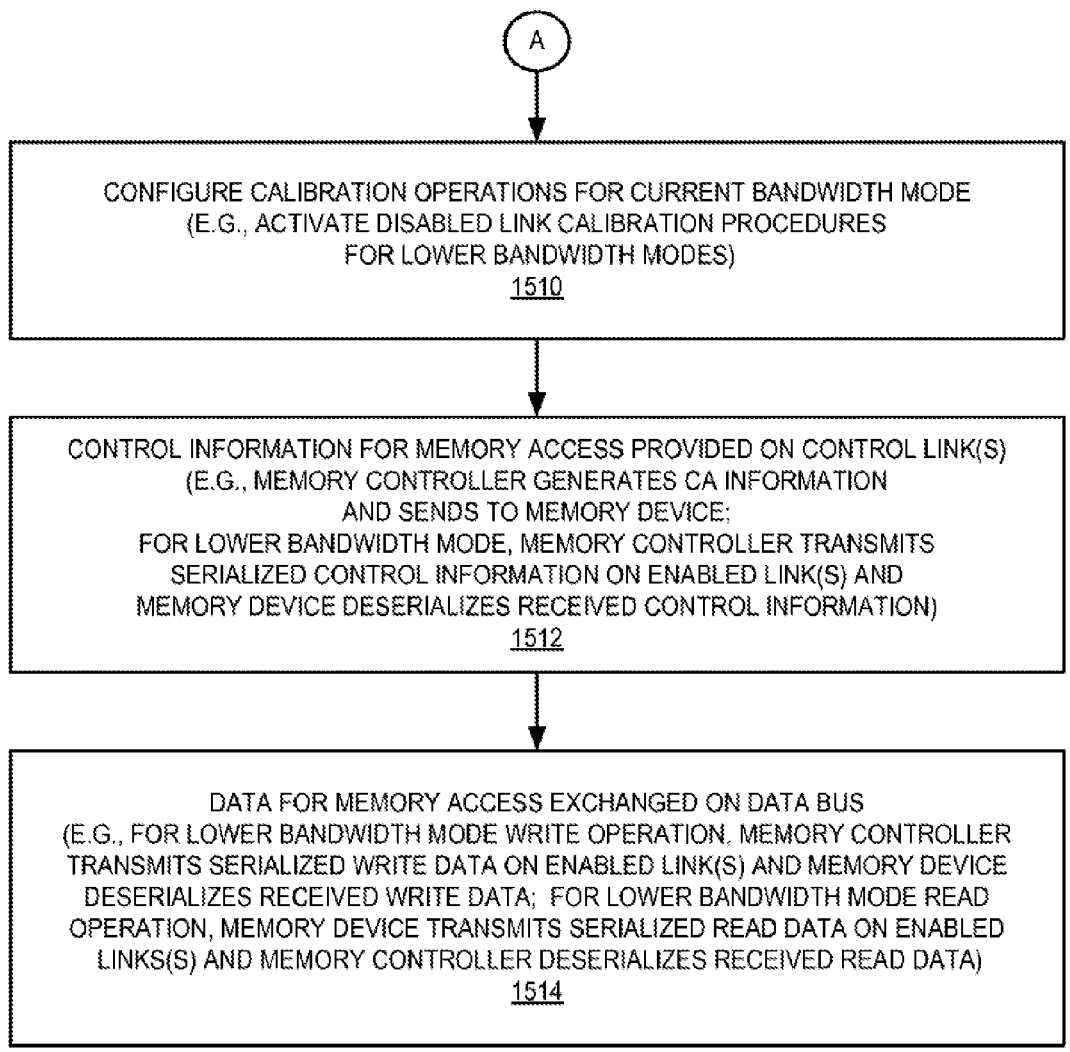

The teachings herein may be implemented in a various ways and different terminology may be employed to describe various aspects of the above-described circuitry and operations. FIGS. 14-16 describe sample structural components and operations that are employed to provide a dynamic bandwidth scheme as taught herein. In particular, these figures illustrate implementations where several of the components described above are combined in a single embodiment.

In FIG. 14, a memory system 1400 includes a memory controller apparatus 1402 and a memory apparatus 1404. The memory controller apparatus 1402 includes a memory controller 1406 that provides functionality corresponding to the memory controller functions discussed above. Thus, the memory controller 1406 generates CA information that is sent to the memory apparatus 1404 via a set of control links (e.g., a CA bus). In addition, the memory controller 1406 transmits/receives DQ information to/from the memory apparatus 1404 via a set of data links (e.g., a DQ bus). Also, the memory controller 1406 generates a bandwidth mode signal as described herein.

A control circuit 1408 generates control signals 1410 for controlling a steering circuit 1412 and a control interface circuit 1414 in the control path. The control circuit 1408 also provides control information (e.g., a bandwidth mode indication) that is routed via the steering circuit 1412 and the control interface circuit 1414 to the memory apparatus 1404 via the control links. Similarly, the steering circuit 1412 provides at least some of the functionality described above for the serializer circuits and/or the steering circuits. Also, the control interface circuit 1414 provides at least some of the functionality described above for at least one of: the bit-wise link enable circuits, the physical interfaces, or the write adjust circuits. As illustrated in FIG. 14, the control interface circuit 1414 includes driver circuits 1416 (e.g., transmitters) as discussed herein.

The control circuit 1408 also generates control signals 1410 for controlling a steering circuit 1418 and a control interface circuit 1420 in the data path. The steering circuit 1418 provides at least some of the functionality described above for at least one of: the serializer/deserializer circuits and/or the steering circuits. Also, the control interface circuit 1420 provides at least some of the functionality described above for at least one of: the bit-wise link enable circuits, the physical interfaces, the write adjust circuits, or the read adjust circuits. As illustrated in FIG. 14, the control interface circuit 1420 includes driver circuits 1422 (e.g., transmitters) and receiver circuits/parallel terminations 1424 as discussed herein.

The memory controller apparatus 1402 also includes a calibration circuit 1426 that provides calibration information for calibrating the control links and data links. Accordingly, the calibration circuit 1426 provides at least some of the functionality described above for at least one of: the calibration circuits, the disabled link calibration circuits, or the control circuits.

The memory apparatus 1404 includes a memory array 1428 for storing data as discussed herein. Accordingly, the memory controller apparatus 1402 transfers data to/from the memory array 1428 via the data links by sending memory access commands to the memory apparatus 1404 via the control links.

A control circuit 1430 generates control signals 1432 for controlling a steering circuit 1434 and a control interface circuit 1436 in the control path. The control circuit 1430 generates the control signals 1432 based on control information (e.g., a bandwidth mode indication) that is received from the memory controller apparatus 1402 via the control links. The steering circuit 1434 provides at least some of the functionality described above for the deserializer circuits and/or the steering circuits. Also, the control interface circuit 1436 provides at least some of the functionality described above for at least one of: the bit-wise link enable circuits, the physical interfaces, or the read adjust circuits. As illustrated in FIG. 14, the control interface circuit 1436 includes receiver circuits/parallel terminations 1438 as discussed herein.

The control circuit 1430 also generates the control signals 1432 for controlling a steering circuit 1440 and a control interface circuit 1442 in the data path. The steering circuit 1440 provides at least some of the functionality described above for at least one of: the serializer/deserializer circuits, the serializer circuits, or the steering circuits. Also, the control interface circuit 1442 provides at least some of the functionality described above for at least one of: the bit-wise link enable circuits, the physical interfaces, the write adjust circuits, or the read adjust circuits. As illustrated in FIG. 14, the control interface circuit 1442 includes driver circuits 1444 and receiver circuits/parallel terminations 1446 as discussed herein.

In some implementations, the memory apparatus 1404 includes a calibration circuit 1448 that provides calibration information for calibrating the control links and data links. Accordingly, the calibration circuit 1448 provides at least some of the functionality described above for at least one of: the calibration circuits, the disabled link calibration circuits, or the control circuits.

Referring to the flowchart of FIGS. 15 and 16, an overview of several operations that are performed by the components of FIG. 14 or other suitable components are described. It should be appreciated that not all of these operations will be performed in a given implementation.

As represented by block 1502, at some point in time, a memory controller device provides an indication of a change in bandwidth mode and/or an indication of a change in whether signals are to be routed in parallel or series, and sends this indication to the memory device via a control link. For example, as discussed herein, the memory controller device sends control information (e.g., an opcode) to the memory device via a designated link of the CA bus.

As represented by block 1504, the memory controller device and the memory device generate control signals to control transitions between bandwidth modes. For example, the control circuits discussed above generate serialization gearing control signals and link enable signals based on a received indication (e.g., a received power mode indication for the memory controller device and a received bandwidth mode indication for the memory device).

As represented by block 1506, the memory controller device and the memory device enable or disable links based on the control signals generated at block 1504. For example, power is cutoff for the transmitter and the receiver of a disabled link, and the transmitter and/or the receiver of an enabled link is set to transmit and/or receive on the link.

As represented by block 1508, the memory controller device and the memory device select between routing signals in parallel or in series on the links. For example, the serialization gearing of the serializer and deserializer circuits is configured based on which links (and corresponding driver and receiver circuits) are enabled.

As represented by block 1510 of FIG. 16, the memory controller device (optionally the memory device) configures its calibration operations depending on the current bandwidth mode. For example, a disabled link calibration procedure for certain links is activated during a lower bandwidth mode.

As represented by blocks 1512 and 1514, a memory access is performed in the current bandwidth mode. Thus, at block 1512, the memory controller device sends control information (e.g., CA information) for the memory access to the memory device via the enabled control link(s). In a lower bandwidth mode, the memory controller device serializes the control information for transmission on a reduced number of control links and the memory device deserializes the received control information.

At block 1514, the memory controller device and the memory device exchange the data for the memory access via the enabled data link(s). For a lower bandwidth mode write operation, the memory controller device serializes the data for transmission on a reduced number of data links and the memory device deserializes the received data. For a lower bandwidth mode read operation, the memory device serializes the data for transmission on a reduced number of data links and the memory controller device deserializes the received data.

Through the use of the techniques described herein, a system is able to efficiently switch between different power modes without suffering a loss in performance due to the latency issues that would otherwise result from changes in data transfer bandwidth over calibrated and terminated signaling links. Such a system may therefore be advantageously employed in platforms such as mobile platforms that have high processing requirements and critical power constraints.

It should be appreciated that various modifications may be incorporated into the disclosed embodiments based on the teachings herein. For example, different link enablement configurations may be employed in different embodiments. The teachings herein may be employed in a memory system that includes more than one memory controller device and/or more than one memory device. Also, these components may be implemented within other components such as, for example, a processor, an SoC, a memory module, and so forth. Moreover, the teachings herein may be implemented in other types of apparatuses.

In a typical implementation, the memory controller device and the memory device reside on different integrated circuits. They may reside on the same integrated circuit in other implementations, however. In various embodiments, an integrated circuit takes the form of, for example, a single die, a flip chip, a package mounting a die, or a package mounting several dies.

A memory controller device (e.g., an integrated circuit incorporating memory controller functionality) and a memory device (e.g., an integrated circuit incorporating a memory core) as taught herein may take various forms. For example, a memory controller device may comprise a memory controller chip, a processor chip that includes controller functionality, an SoC, or some other suitable device. In some aspects, a memory device may comprise a semiconductor integrated circuit device that includes a set of storage cells, which may collectively provide a memory array or a portion of a memory array.

Examples of different memory types (i.e., memory technologies) that may be employed for a memory device in accordance with the teachings herein include, without limitation, volatile memory devices, nonvolatile memory devices, flash memory, dynamic RAM (DRAM), resistive RAM (RRAM), magnetoresistive RAM (MRAM), phase change memory (PCM), and static RAM (SRAM). Various characteristics of these memory types are configured to facilitate using these memory types together over a shared bus as taught herein in some cases. For example, in some implementations the different types of memory use identical protocols, signaling levels and pin outs. In other implementations, however, one or more of these characteristics will be different between the different memory types.

A memory system as taught herein may be used in a variety of applications. For example, such a memory system may be incorporated into a portable device, a mobile phone, a computer graphics card, a videogame console, a printer, a personal computer, a server, a processing system (e.g., a CPU device), or some other apparatus that utilizes data storage.

It also should be appreciated that the various structures and functions described herein may be implemented in various ways and using a variety of apparatuses. For example, an apparatus (e.g., a device) may be implemented by various hardware components such a processor, a controller, a state machine, logic, or some combination of one or more of these components. In some aspects, an apparatus or any component of an apparatus may be configured to provide functionality as taught herein by, for example, manufacturing (e.g., fabricating) the apparatus or component so that it will provide the functionality, by programming the apparatus or component so that it will provide the functionality, or through the use of some other suitable means.

In some embodiments, code including instructions (e.g., software, firmware, middleware, etc.) may be executed on one or more processing devices to implement one or more of the described functions or components. The code and associated components (e.g., data structures and other components by the code or to execute the code) may be stored in an appropriate data memory that is readable by a processing device (e.g., commonly referred to as a computer-readable medium).

The recited order of the blocks in the processes disclosed herein is simply an example of a suitable approach. Thus, operations associated with such blocks may be rearranged while remaining within the scope of the present disclosure. Similarly, the accompanying method claims present operations in a sample order, and are not necessarily limited to the specific order presented.

The components and functions described herein may be connected or coupled in various ways. The manner in which this is done may depend, in part, on whether and how the components are separated from the other components. In some embodiments some of the connections or couplings represented by the lead lines in the drawings may be in an integrated circuit, on a circuit board or implemented as discrete wires, or in some other way.

The signals discussed herein may take various forms. For example, in some embodiments a signal may comprise electrical signals transmitted over a wire, light pulses transmitted through an optical medium such as an optical fiber or air, or RF waves transmitted through a medium such as air, etc. In addition, a plurality of signals may be collectively referred to as a signal herein. The signals discussed above also may take the form of data. For example, in some embodiments an application program may send a signal to another application program. Such a signal may be stored in a data memory.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set (or a subset) of elements may comprise one or more elements.

The specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

In view of the above, it will be understood that various modifications may be made to the illustrated embodiments and other embodiments as taught herein, without departing from the broad inventive scope thereof. Accordingly, the teachings herein are not limited to the particular embodiments or arrangements disclosed, but are rather intended to cover any changes, adaptations or modifications which are within the scope of the appended claims.

What is claimed is:

1. A method of switching between a first mode of operation and a second mode of operation of an integrated circuit device, the method comprising:
   transferring data during the first mode via each link of a plurality of links;
   disabling each link of a first subset of the plurality of links during the second mode;
   transferring data during the second mode via each link of a second subset of the plurality of links that is not disabled, wherein a common signaling rate is employed for the data transfers via the second subset of the plurality of links during the first mode and the second mode; and
   updating at least one timing adjustment value for the disabled first subset of the plurality of links during the second mode while the second subset of the plurality of links is enabled, wherein the at least one updated timing adjustment value for the disabled first subset of the plurality of links is based on first calibration information generated to calibrate the first subset of the plurality of links during the first mode and second calibration information generated to calibrate the enabled second subset of the plurality of links during the second mode.

2. The method of claim 1, further comprising:
   transferring control information during the first mode via each link of a plurality of control links;
   disabling each link of a first subset of the plurality of control links during the second mode;
   transferring the control information during the second mode via each link of a second subset of the plurality of control links that is not disabled; and
   updating at least one timing adjustment value for the disabled first subset of the plurality of control links during the second mode while the second subset of the plurality of control links is enabled.

3. The method of claim 1, wherein the first calibration information is established before disabling each link of a first subset of the plurality of links.

4. The method of claim 2, wherein establishing the first calibration information comprises:
   transmitting calibration data over the enabled first subset of the plurality of links; and,
   generating the first calibration information to update the at least one timing adjustment value based on the transmission of the calibration data over the enabled first subset of the plurality of links.

5. The method of claim 1, wherein the updating of the at least one timing adjustment value for the first subset of the plurality of links during the second mode is performed:
   after receiving an indication that a transition from the second mode to the first mode is to occur; and,
   before the transition from the second mode to the first mode.

6. A first integrated circuit device comprising:
   a plurality of driver circuits to transfer data to a second integrated circuit device via a plurality of signaling links;
   a steering circuit to select between concurrently routing the data across all of the driver circuits if all of the driver circuits are enabled and employing at least partial serialization to route the data to a first subset of the driver circuits if a second subset of the driver circuits is disabled;
   a control circuit to transfer control information between the first integrated circuit device and the second integrated circuit device, wherein the control information provides an indication of how many of the signaling links are employed to transfer the data; and
   a calibration circuit to update, while the second subset of the driver circuits is disabled, at least one timing adjustment value for the disabled second subset of the driver circuits based on first calibration information generated to calibrate the first subset of the driver circuits while the second subset of the driver circuits is disabled and second calibration information generated to calibrate the second subset of the driver circuits while the second subset of the driver circuits is enabled.

7. The integrated circuit device of claim 6, wherein:
the first integrated circuit device comprises a memory controller device;
the second integrated circuit device comprises a memory device; and,
the transfer of the control information comprises transmitting the control information to the memory device.

8. The integrated circuit device of claim 7, wherein the control circuit generates the control information as a result of receiving a signal that indicates that the first integrated circuit device is transitioning between a lower power mode and a higher power mode.

9. The integrated circuit device of claim 7, wherein:
the control circuit generates control signals for enabling and disabling the driver circuits and for controlling the steering circuit; and,
the control signals are generated as a result of receiving a signal that indicates that the first integrated circuit device is transitioning between a lower power mode and a higher power mode.

10. The integrated circuit device of claim 9, wherein the driver circuits are individually enabled based on the control signals.

11. The integrated circuit device of claim 6, wherein a relative value function is used to calculate the at least one timing adjustment value.

12. The integrated circuit device of claim 6, wherein:
the first integrated circuit device comprises a memory device;
the second integrated circuit device comprises a memory controller device; and,
the transfer of the control information comprises receiving the control information from the memory controller device.

13. The integrated circuit device of claim 6, wherein the control circuit generates, based on the control information, control signals for enabling and disabling the driver circuits and for controlling the steering circuit.

14. The integrated circuit device of claim 6, wherein the control information is transferred via at least one sideband link.

15. The integrated circuit device of claim 6, wherein the control information comprises an opcode.

16. A method for transferring data from a first integrated circuit device to a second integrated circuit device via a plurality of driver circuits that drive a plurality of signaling links, the method of comprising:
selecting between concurrently routing the data across all of the driver circuits if all of the driver circuits are enabled and employing at least partial serialization to route the data to a first subset of the driver circuits if a second subset of the driver circuits is disabled;
transferring control information between the first integrated circuit device and the second integrated circuit device, wherein the control information provides an indication of how many of the signaling links are employed to transfer the data; and
updating, while the first subset of the driver circuits is enabled, at least one timing adjustment value for the disabled second subset of the driver circuits based on based on first calibration information generated to calibrate the first subset of the driver circuits while the second subset of the driver circuits is disabled and second calibration information generated to calibrate the second subset of the driver circuits while the second subset of the driver circuits is enabled.

17. The method of claim 16, further comprising generating the control information as a result of receiving a signal that indicates that the first integrated circuit device is transitioning between a lower power mode and a higher power mode.

18. The method of claim 16, further comprising enabling and disabling the driver circuits and controlling the selection based on a signal that indicates that the first integrated circuit device is transitioning between a lower power mode and a higher power mode.

19. The method of claim 16, further comprising enabling and disabling the driver circuits and controlling the selection based on the control information.

20. The method of claim 16, wherein a relative value function is used to calculate the at least one timing adjustment value.

* * * * *